US011657319B2

(12) United States Patent
Suzuki et al.

(10) Patent No.: US 11,657,319 B2
(45) Date of Patent: May 23, 2023

(54) INFORMATION PROCESSING APPARATUS, SYSTEM, INFORMATION PROCESSING METHOD, AND NON-TRANSITORY COMPUTER-READABLE STORAGE MEDIUM FOR OBTAINING POSITION AND/OR ORIENTATION INFORMATION

(71) Applicant: CANON KABUSHIKI KAISHA, Tokyo (JP)

(72) Inventors: Masahiro Suzuki, Kawasaki (JP); Daisuke Kotake, Yokohama (JP); Kazuhiko Kobayashi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 1170 days.

(21) Appl. No.: 16/244,312

(22) Filed: Jan. 10, 2019

(65) Prior Publication Data

US 2019/0220775 A1     Jul. 18, 2019

(30) Foreign Application Priority Data

Jan. 15, 2018 (JP) .............................. JP2018-004468

(51) Int. Cl.
*G06N 20/00* (2019.01)
*G05D 1/04* (2006.01)
(Continued)

(52) U.S. Cl.
CPC .............. *G06N 20/00* (2019.01); *G05D 1/04* (2013.01); *G05D 1/10* (2013.01); *G06T 7/50* (2017.01);
(Continued)

(58) Field of Classification Search
CPC . G06N 20/00; G06T 7/50; G06T 7/75; G05D 1/04; G05D 1/10
See application file for complete search history.

(56) References Cited

U.S. PATENT DOCUMENTS 7,031,496 B2    4/2006  Shimano
8,195,394 B1 *  6/2012  Zhu .................... G08G 1/09626
                                                              382/107
(Continued)

FOREIGN PATENT DOCUMENTS

CN    102914293 A    2/2013
CN    103020952 A    4/2013
(Continued)

OTHER PUBLICATIONS

Tateno et al. "CNN-SLAM: Real-time dense monocular SLAM with learned depth prediction." IEEE Computer Society Conference on Computer Vision and Pattern Recognition (CVPR). 2017: 6243-6252. Cited in the Specification.
(Continued)

*Primary Examiner* — Ramsey Refai
(74) *Attorney, Agent, or Firm* — Rossi, Kimms & McDowell LLP

(57) ABSTRACT

As learning data, an image of a virtual space corresponding to a physical space and geometric information of the virtual space is generated. Learning processing of a learning model is performed using the learning data. A position and/or orientation of an image capturing device is calculated based on geometric information output from the learning model when a captured image of the physical space captured by the image capturing device is input to the learning model.

18 Claims, 15 Drawing Sheets

(51) Int. Cl.
*G05D 1/10* (2006.01)
*G06T 7/50* (2017.01)
*G06T 7/73* (2017.01)

(52) U.S. Cl.
CPC ...... *G06T 7/75* (2017.01); *G06T 2207/10016* (2013.01); *G06T 2207/10024* (2013.01); *G06T 2207/20081* (2013.01); *G06T 2207/30244* (2013.01); *G06T 2207/30248* (2013.01)

(56) References Cited

U.S. PATENT DOCUMENTS

| | | | | |
|---|---|---|---|---|
| 8,542,106 | B2* | 9/2013 | Hilsebecher | G01S 17/931 340/436 |
| 9,097,800 | B1* | 8/2015 | Zhu | G01S 13/931 |
| 9,201,421 | B1* | 12/2015 | Fairfield | G06V 20/58 |
| 9,429,418 | B2 | 8/2016 | Mitarai | |
| 9,720,415 | B2* | 8/2017 | Levinson | G05D 1/0257 |
| 9,852,340 | B2* | 12/2017 | Mai | G06V 10/24 |
| 2010/0191391 | A1* | 7/2010 | Zeng | G01S 13/87 701/1 |
| 2013/0253796 | A1* | 9/2013 | Luo | B60K 31/0008 701/1 |
| 2017/0307735 | A1* | 10/2017 | Rohani | G01S 13/865 |
| 2019/0384964 | A1* | 12/2019 | Ando | G06T 7/50 |
| 2020/0074266 | A1* | 3/2020 | Peake | G06V 10/774 |

FOREIGN PATENT DOCUMENTS

| | | |
|---|---|---|
| CN | 103307975 A | 9/2013 |
| CN | 106326523 A | 1/2017 |
| JP | 2002083297 A | 3/2002 |
| JP | 2011198349 A | 10/2011 |
| JP | 2011248445 A | 12/2011 |

OTHER PUBLICATIONS

Engel et al. "LSD-SLAM: Large-Scale Direct Monocular SLAM." European Conference on Computer Vision (ECCV). 2014: 1-16. Cited in the Specification.

Office Action issued in Japanese Application No. 2018-004468 dated Jan. 7, 2022.

Office Action issued in Chinese Appln No. 201910037242.0 dated Nov. 18, 2022. English translation provided.

* cited by examiner

INFORMATION PROCESSING APPARATUS, SYSTEM, INFORMATION PROCESSING METHOD, AND NON-TRANSITORY COMPUTER-READABLE STORAGE MEDIUM FOR OBTAINING POSITION AND/OR ORIENTATION INFORMATION

BACKGROUND OF THE INVENTION

Field of the Invention

The present invention relates to a technique of obtaining a position and/or orientation.

Description of the Related Art

Measurement of the position and/or orientation (to be referred to as position/orientation hereinafter) of an image capturing device based on image information is used for various purposes such as self-position/orientation estimation of a robot or an automobile or the alignment between the physical space and a virtual object in mixed reality/augmented reality.

K. Tateno, F. Tombari, I. Laina, and N. Navab, "CNN-SLAM: Real-time dense monocular SLAM with learned depth prediction", IEEE Computer Society Conference on Computer Vision and Pattern Recognition (CVPR), 2017 discloses a method of estimating geometric information (depth information), which is an index used to calculate a position/orientation from image information using a learning model learned in advance and calculating position/orientation information based on the estimated geometric information.

K. Tateno, F. Tombari, I. Laina, and N. Navab, "CNN-SLAM: Real-time dense monocular SLAM with learned depth prediction", IEEE Computer Society Conference on Computer Vision and Pattern Recognition (CVPR), 2017 assumes that the appearance of the scene of an image used to generate a learning model and the appearance of a scene included in an input image captured by an image capturing device are similar. Hence, there is a demand for a solution to improve the position/orientation calculation accuracy in a case in which the appearances of scenes are not similar.

SUMMARY OF THE INVENTION

The present invention provides a technique of accurately obtaining a position and/or orientation.

According to the first aspect of the present invention, there is provided an information processing apparatus comprising: a generation unit configured to generate, as learning data, an image of a virtual space corresponding to a physical space and geometric information of the virtual space; a learning unit configured to perform learning processing of a learning model using the learning data; and a calculation unit configured to calculate a position and/or orientation of an image capturing device based on geometric information output from the learning model when a captured image of the physical space captured by the image capturing device is input to the learning model.

According to the second aspect of the present invention, there is provided a system comprising: an information processing apparatus comprising: a generation unit configured to generate, as learning data, an image of a virtual space corresponding to a physical space and geometric information of the virtual space; a learning unit configured to perform learning processing of a learning model using the learning data; and a calculation unit configured to calculate a position and/or orientation of an image capturing device based on geometric information output from the learning model when a captured image of the physical space captured by the image capturing device is input to the learning model, wherein the calculation unit calculating a position and/or orientation of a vehicle including the information processing apparatus based on the position and/or orientation of the image capturing device; and a control unit configured to perform driving control of the vehicle based on the geometric information and the position and/or orientation of the vehicle calculated by the calculation unit.

According to the third aspect of the present invention, there is provided an information processing method performed by an information processing apparatus, comprising: generating, as learning data, an image of a virtual space corresponding to a physical space and geometric information of the virtual space; performing learning processing of a learning model using the learning data; and calculating a position and/or orientation of an image capturing device based on geometric information output from the learning model when a captured image of the physical space captured by the image capturing device is input to the learning model.

According to the fourth aspect of the present invention, there is provided a non-transitory computer-readable storage medium storing a computer program configured to cause a computer to function as: a generation unit configured to generate, as learning data, an image of a virtual space corresponding to a physical space and geometric information of the virtual space; a learning unit configured to perform learning processing of a learning model using the learning data; and a calculation unit configured to calculate a position and/or orientation of an image capturing device based on geometric information output from the learning model when a captured image of the physical space captured by the image capturing device is input to the learning model.

Further features of the present invention will become apparent from the following description of exemplary embodiments (with reference to the attached drawings).

DESCRIPTION OF THE EMBODIMENTS

The embodiments of the present invention will now be described with reference to the accompanying drawings. Note that the embodiments to be described below are examples of detailed implementation of the present invention or detailed embodiments of the arrangement described in the appended claims.

First Embodiment

Figure 1:
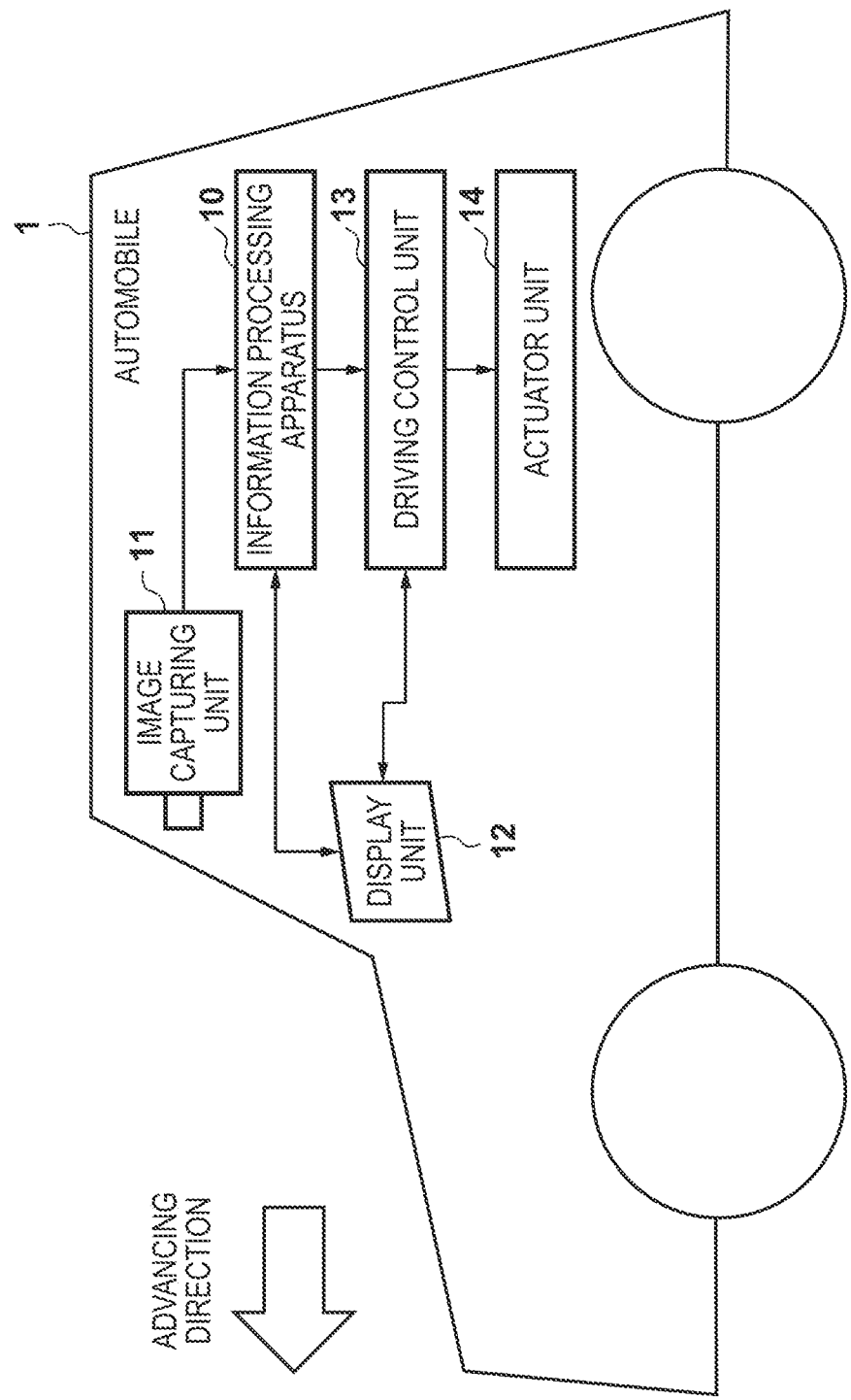
FIG. 1 is a block diagram showing an example of the arrangement of a system.

In this embodiment, a system configured to calculate the position and/or orientation ("position and/or orientation" will be referred to as position/orientation hereinafter) of an automobile to perform automated driving of the automobile will be described. An example of the arrangement of the system according to this embodiment will be described with reference to the block diagram of FIG. 1.

An image capturing unit 11 is stationarily attached to the back side of the windshield of an automobile 1 toward the advancing direction (the direction indicated by an arrow) of the automobile 1, and captures a movie of the environment (the physical space or scene) in the advancing direction. The image (captured image) of each frame of the movie captured by the image capturing unit 11 is output to an information processing apparatus 10. The image capturing unit 11 is, for example, a camera (RGB color camera) capable of capturing a color movie. Note that the attachment position of the image capturing unit 11 is not limited to a specific attachment position as long as it is a position capable of capturing the environment in the advancing direction of the automobile 1. In addition, the relative position/orientation relationship between the automobile 1 and the image capturing unit 11 is calibrated in advance, and the relative position/orientation relationship is registered as known information (bias information) in the information processing apparatus 10.

A display unit 12 is stationarily attached near the dashboard of the automobile 1 and includes a touch panel screen. The display unit 12 can display various kinds of information output from the information processing apparatus 10 or a driving control unit 13, thereby providing the various kinds of information to the driver or passenger in the automobile 1. In addition, the driver or passenger in the automobile 1 can perform various kinds of operation inputs such as a touch operation and a swipe operation on the touch panel screen, thereby performing various kinds of inputs to the information processing apparatus 10. Note that the display unit 12 need not always include a touch panel screen, and may include a display screen configured to display information and a user interface such as a button group used to receive an operation input from the driver or passenger in the automobile 1.

The information processing apparatus 10 estimates the geometric information of the scene in which the automobile 1 travels and the position/orientation of the automobile 1 based on the image captured by the image capturing unit 11, and outputs the estimated geometric information and the position/orientation of the automobile 1 to the driving control unit 13. The information processing apparatus 10 also performs learning processing of a learning model to be used for the estimation. In addition, the information processing apparatus 10 outputs, to the display unit 12, various kinds of information to be displayed.

The driving control unit 13 decides the rotation torques of the wheels of the automobile 1 and the advancing direction of the automobile 1 based on the geometric information and the position/orientation output from the information processing apparatus 10, and notifies an actuator unit 14 of the decided rotation torques and advancing direction. The actuator unit 14 controls driving of the wheels of the automobile 1 based on the rotation torques of the wheels and the advancing direction notified from the driving control unit 13. Note that the pieces of information decided by the driving control unit 13 are not limited to the rotation torques of the wheels of the automobile 1 and the advancing direction of the automobile 1 and may be any information as long as the pieces of information concern the driving control of the automobile 1. For example, it may be information concerning the brake or blinker of the automobile 1. The actuator unit 14 controls driving of the wheels of the automobile 1 based on the pieces of information from the driving control unit 13.

As described above, the automobile 1 is an automobile that decides the rotation torques of the wheels of the automobile 1 and the advancing direction from the geometric information and position/orientation estimated based on the captured image and controls driving of the wheels of the automobile 1 based on the rotation torques and the advancing direction, thereby performing automated driving.

Figure 2:
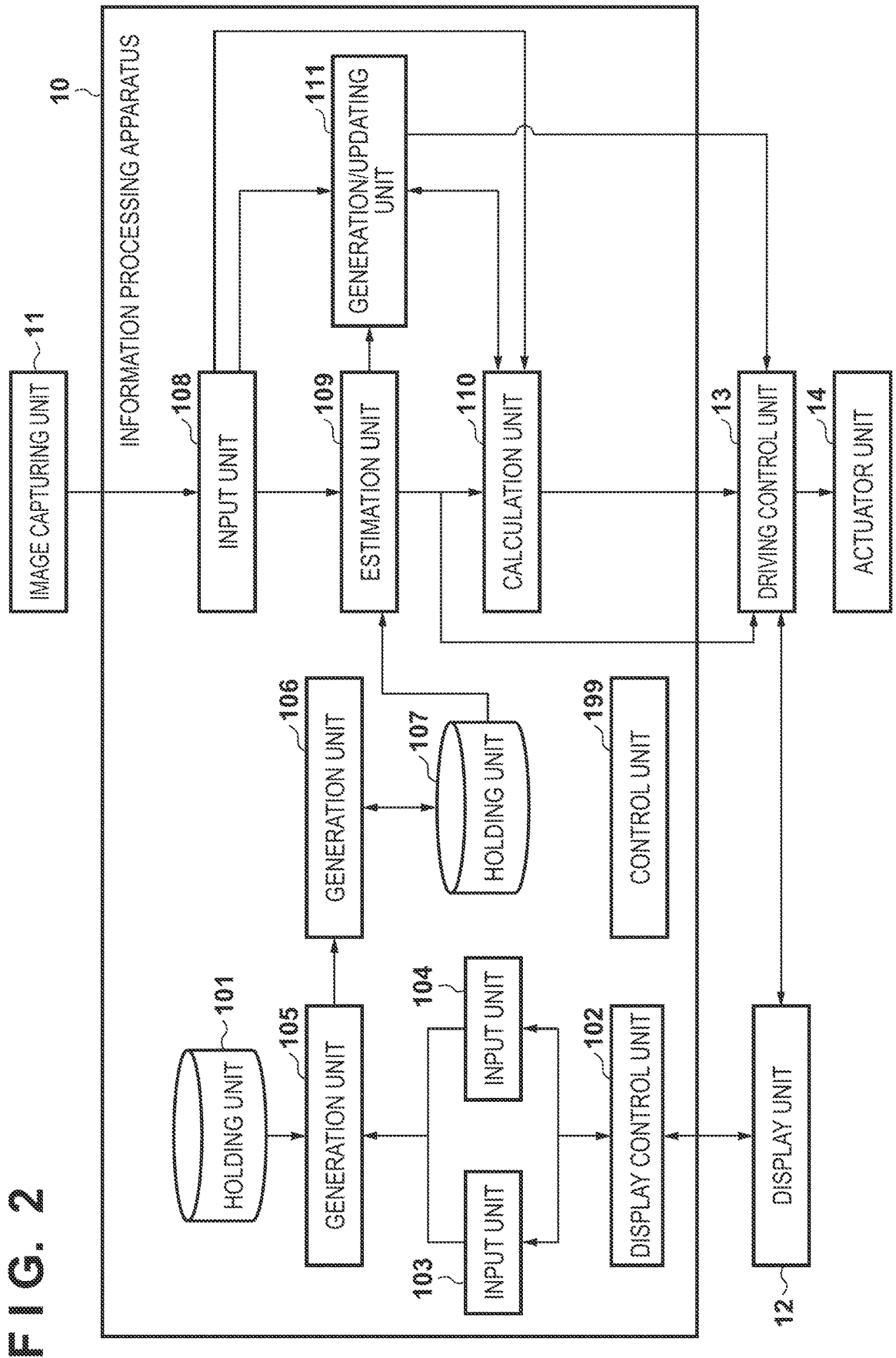
FIG. 2 is a block diagram showing an example of the functional arrangement of an information processing apparatus 10.

An example of the functional arrangement of the information processing apparatus 10 will be described next with reference to the block diagram of FIG. 2. Note that the components shown in FIG. 2 are merely examples of components capable of implementing each processing to be described later as processing to be performed by the information processing apparatus 10. For example, several functional units may be integrated into one functional unit, or one functional unit may be divided into a plurality of functional units on a function basis. A control unit 199 controls the operation of the entire information processing apparatus 10.

A holding unit 101 holds the model data of an object existing around the automobile 1 in the environment in which the automobile 1 travels. The "object existing around the automobile 1 in the environment in which the automobile 1 travels" is, for example, a physical object such as a road, a sign, a traffic signal, a building, a natural object, a person, an animal, an automobile, or a bicycle, which exists in the environment in which the automobile 1 travels. Additionally, for example, in a case in which an object is expressed as a polygon, "the model data of the object" includes polygon data (the normal vector of each polygon, the three-dimensional coordinates of vertexes of the polygon, the color and attribute of the polygon, and the like) and texture data. In a case in which an object is expressed as a point group, "the model data of the object" includes the three-dimensional coordinates of each point of the point group. In addition, each point may have color information. As described above, the model data of the object may be any data as long as it is data representing the geometric shape of the object.

A display control unit 102 controls the display on the display unit 12 and acquires parameters (viewpoint parameters and environment parameters) that the driver or passenger in the automobile 1 inputs by performing an operation such as a touch operation or swipe operation on the display unit 12.

The viewpoint parameters are parameters concerning a viewpoint (virtual viewpoint) set in a virtual space formed by a virtual object (model) generated based on the model data held by the holding unit 101, and include, for example, arrangement parameters, image capturing parameters, and a moving speed parameter. The arrangement parameters include parameters such as the position/orientation of each virtual viewpoint in the virtual space and the number of virtual viewpoints. The image capturing parameters include the internal parameters of the virtual viewpoint such as the focal length and the principal point of each virtual viewpoint and parameters such as the exposure time and the focus position of each virtual viewpoint. The moving speed parameter is a parameter representing the moving speed of the virtual viewpoint.

On the other hand, the environment parameters are parameters concerning a virtual space formed by a virtual object (model) generated based on the model data held by the holding unit 101, and include, for example, illumination parameters, object parameters, and region parameters. The illumination parameters are parameters for defining illumination conditions that change based on changes in time, season, weather state, and the like. The object parameters are parameters concerning the types, number, positions, orientations, sizes, and the like of models arranged in the virtual space. The region parameters are parameters such as the names and positions of a country, a place, and a region in which the automobile 1 travels, and rules (for example, whether the traffic lane of a road is right or left, the maximum speed on a highway, and the like) based on the laws and ordinances of the region, and the like.

The display control unit 102 outputs the viewpoint parameters that the driver or passenger in the automobile 1 inputs by operating the display unit 12 to an input unit 103, and outputs the environment parameters that the driver or passenger in the automobile 1 inputs by operating the display unit 12 to an input unit 104.

The input unit 103 outputs the viewpoint parameters received from the display control unit 102 to a generation unit 105, and the input unit 104 outputs the environment parameters received from the display control unit 102 to the generation unit 105. Note that the input method of the viewpoint parameters and the environment parameters to the generation unit 105 is not limited to the above-described method, and, for example, viewpoint parameters and environment parameters registered in advance in a memory provided in the information processing apparatus 10 may be input to the generation unit 105.

The generation unit 105 generates an image (virtual space image) representing a virtual space defined by the model data held by the holding unit 101 and the environment parameters input from the input unit 104 and viewed from a virtual viewpoint defined by the viewpoint parameters input from the input unit 103. In addition, the generation unit 105 generates the geometric information (depth map) of the virtual space viewed from the virtual viewpoint. For example, the generation unit 105 generates models based on the model data held by the holding unit 101, and arranges the models in the virtual space in accordance with the number, positions, orientations, sizes, and the like defined by the object parameters included in the environment parameters, thereby constructing the virtual space. Note that the models are arranged in accordance with, for example, rules defined by the region parameters. For example, when arranging a model of an automobile, whether to arrange the model on the right lane or the left lane is decided in accordance with the rules of each region defined by the region parameters. The generation unit 105 generates, as a virtual space image, an image representing the constructed virtual space viewed from the virtual viewpoint defined by the viewpoint parameters under the illumination conditions defined by the illumination parameters included in the environment parameters. Note that the virtual space image generated by the generation unit 105 is preferably similar to the appearance in the image captured by the image capturing unit 11. If the viewpoint parameters and the environment parameters are appropriately set so as to conform to the design information, the driving situation, and the driving environment of the automobile 1, the generated virtual space image becomes similar to the appearance of the image captured by the image capturing unit 11. It is therefore possible to accurately perform position/orientation calculation. The generation unit 105 also generates the geometric information of the constructed virtual space viewed from the virtual viewpoint. Note that in this embodiment, the virtual space image and the geometric information (depth map) are generated to the same or almost the same scale, that is, a scale within a predetermined range. More specifically, the virtual space image and the geometric information (depth map) are generated by drawing (rendering) them at the same or almost the same angle of view, that is, an angle of view within a predetermined range. Then, the generation unit 105 outputs the set of the generated virtual space image and geometric information as learning data to a generation unit 106. Note that the generation unit 105 changes the viewpoint parameters input from the input unit 103 or the environment parameters input from the input unit 104, thereby generating different "sets of viewpoint parameters and environment parameters". For example, the illumination parameters included in the environment parameters may be changed to generate environment parameters corresponding to various illumination conditions (time, season, weather state, and the like). Alternatively, the object parameters included in the environment parameters may be changed to generate environment parameters corresponding to various model arrangement states in which a model to be arranged in the virtual space is added or a model is deleted. Otherwise, the region parameters included in the environment parameters may be changed to generate environment parameters corresponding to various regions. The generation unit 105 generates learning data corresponding to each set, thereby generating learning data corresponding to various viewpoint parameters or various environment parameters. In addition, when generating the learning data, the level of detail on the image may be raised (the compression ratio may be lowered) for an object such as a sign or a traffic signal that is important for the automated driving of the automobile 1.

The generation unit 106 obtains, for each learning data received from the generation unit 105, the difference between information output from a learning model when the virtual space image included in the learning data is input to the learning model and the geometric information (supervised data) included in the learning data. Then, the generation unit 106 updates the learning model such that the difference becomes smaller for each learning data, thereby performing learning processing of the learning model (a method such as backpropagation). In this embodiment, a case in which a CNN (Convolutional Neural Network) is applied to the learning model will be described. However, any learning model can be used as long as it is a learning model configured to output corresponding geometric information when an image is input. For example, a model of machine learning may be used as the learning model, and the learning model is not limited to a CNN.

A more robust learning model can be generated by generating learning data corresponding to various situations (states) and using them for learning of a learning model. The generation unit 106 stores the learned learning model in a holding unit 107.

An input unit 108 acquires the captured image (image information) of each frame output from the image capturing unit 11, and outputs the acquired captured image to an estimation unit 109, a calculation unit 110, and a generation/updating unit 111 of the subsequent stage. The input unit 108 is formed by, for example, an image capture board.

The estimation unit 109 reads out the learning model stored in the holding unit 107, and inputs the captured image received from the input unit 108 to the readout learning model, thereby outputting the geometric information output from the learning model to the calculation unit 110 and the generation/updating unit 111 of the subsequent stage.

Note that in this embodiment, the captured image and the geometric information output from the learning model have the same or almost the same scale. That is, the captured image and the geometric information output from the learning model have the same or almost the same angle of view. This can be implemented by setting the same or almost the same angle of view to the captured image, the virtual space image generated by the generation unit 105, and the geometric information. If the scale of the captured image and that of the geometric information output from the learning model are different, the geometric information output from the learning model is multiplied by the ratio of the angle of view, thereby adjusting the scale to that of the captured image.

The calculation unit 110 obtains the position/orientation of the image capturing unit 11 using the captured image sent from the input unit 108 and the geometric information sent from the estimation unit 109, and converts the obtained position/orientation into the position/orientation of the automobile 1 using the above-described bias information. Then, the calculation unit 110 sends the converted position/orientation of the automobile 1 and the geometric information output from the estimation unit 109 to the driving control unit 13 and the generation/updating unit 111 of the subsequent stage.

An example of the method of calculating the position/orientation of the image capturing unit 11 by the calculation unit 110 will be described here. More specifically, to a captured image (current frame) captured at time t, each pixel of a preceding frame is projected based on geometric information (preceding geometric information) output from a learning model when the captured image (preceding frame) captured at time t' before the current frame is input to the learning model. Here, "project" means calculating a position where each pixel of the preceding frame is located in the current frame. More specifically, using image coordinates $(u_{t-1}, v_{t-1})$ of a pixel of interest in the preceding frame, internal parameters (fx, fy, cx, and cy) of the image capturing unit 11, and a depth value D of the pixel of interest in the preceding geometric information, the calculation unit 110 calculates $$\begin{bmatrix} X_{t-1} \\ Y_{t-1} \\ Z_{t-1} \end{bmatrix} = D \begin{bmatrix} (u_{t-1} - c_x)/f_x \\ (v_{t-1} - c_y)/f_y \\ 1 \end{bmatrix} \quad (1)$$

The calculation unit 110 can thus obtain three-dimensional coordinates $(X_{t-1}, Y_{t-1}, Z_{t-1})$ of the pixel of interest on the camera coordinate system of the preceding frame.

Here, a camera coordinate system is, for example, a coordinate system that has its origin at the position of the image capturing unit 11 (for example, the position of an image sensor) and uses three axes (a total of three axes including two axes orthogonal to each other at the origin with respect to the visual axis direction of the image capturing unit 11 and an axis in the visual axis direction of the image capturing unit 11) orthogonal to each other at the origin as the X-, Y-, and Z-axes.

Here, let $t_{(t-1) \to t}$ be the transformation matrix of the position of the image capturing unit 11 that has captured the current frame with respect to the position of the image capturing unit 11 that has captured the preceding frame, and $R_{(t-1) \to t}$ be the transformation matrix of the orientation of the image capturing unit 11 that has captured the current frame with respect to the orientation of the image capturing unit 11 that has captured the preceding frame. At this time, using $t_{(t-1) \to t}$ and $R_{(t-1) \to t}$, the calculation unit 110 calculates $$\begin{bmatrix} X_t \\ Y_t \\ Z_t \\ 1 \end{bmatrix} = \begin{bmatrix} R_{(t-1) \to t} & t_{(t-1) \to t} \\ 0 & 1 \end{bmatrix} \begin{bmatrix} X_{t-1} \\ Y_{t-1} \\ Z_{t-1} \\ 1 \end{bmatrix} \quad (2)$$

thereby obtaining three-dimensional coordinates $(X_t, Y_t, Z_t)$ of the pixel of interest on the camera coordinate system of the current frame.

Next, the calculation unit 110 calculates $$\begin{bmatrix} u_t \\ v_t \end{bmatrix} = \begin{bmatrix} f_x X_t / Z_t + c_x \\ f_y Y_t / Z_t + c_y \end{bmatrix} \quad (3)$$

thereby converting the three-dimensional coordinates $(X_t, Y_t, Z_t)$ of the pixel of interest on the camera coordinate system of the current frame into image coordinates $(u_t, v_t)$ of the current frame.

In this embodiment, processing according to equations (1) to (3) above is called projection. The calculation unit 110 performs such projection using a feature point such as a corner or an edge separately obtained in the preceding frame or all pixels as the pixel of interest, thereby obtaining corresponding image coordinates in the current frame. Then, the calculation unit 110 calculates $t_{(t-1) \to t}$ and $R_{(t-1) \to t}$ such that the luminance difference between the luminance value of a pixel at the image coordinates $(u_{t-1}, v_{t-1})$ in the preceding frame and the luminance value of a pixel (the image coordinates are $(u_t, v_t)$) in the current frame as the projection destination of the pixel becomes minimum.

Using the position $t_{w \to (t-1)}$ and the orientation $R_{w \to (t-1)}$ of the image capturing unit 11, which has captured the preceding frame, on the world coordinate system the calculation unit 110 calculates $$\begin{bmatrix} R_{w \to t} & t_{w \to t} \\ 0 & 1 \end{bmatrix} = \begin{bmatrix} R_{(t-1) \to t} & t_{(t-1) \to t} \\ 0 & 1 \end{bmatrix} \begin{bmatrix} R_{w \to (t-1)} & t_{w \to (t-1)} \\ 0 & 1 \end{bmatrix} \quad (4)$$

The calculation unit 110 thus calculates a position $t_{w \to t}$ and an orientation $R_{w \to t}$ of the image capturing unit 11, which has captured the current frame, on the world coordinate system.

Here, the world coordinate system is a coordinate system that has its origin at one point in the physical space and uses three axes orthogonal to each other at the origin as the X-, Y-, and Z-axes. Note that the calculation unit 110 may calculate the position/orientation of the image capturing unit 11 using a three-dimensional map generated/updated by the generation/updating unit 111 in addition to the geometric information from the estimation unit 109 and using the SLAM (Simultaneous Localization and Mapping) technique. Calculation of the position/orientation can be performed using the method in K. Tateno, F. Tombari, I. Laina and N. Navab, "CNN-SLAM: Real-time dense monocular SLAM with learned depth prediction", IEEE Computer Society Conference on Computer Vision and Pattern Recognition (CVPR), 2017 or the method of Engel et al. (J. Engel, T. Schöps, and D. Cremers. LSD-SLAM: Large-Scale Direct Monocular SLAM. In European Conference on Computer Vision (ECCV), 2014). When the three-dimensional map is generated/updated using the SLAM technique, geometric information can be accumulated for a road traveled once.

The generation/updating unit 111 generates and updates a three-dimensional map in the environment in which the automobile 1 travels, using the captured image input from the input unit 108, the geometric information input from the estimation unit 109, and the position/orientation input from the calculation unit 110. The generation/updating unit 111 outputs the generated/updated three-dimensional map to the calculation unit 110 and the driving control unit 13.

In this embodiment, the three-dimensional map is used when simultaneously performing the calculation of the position/orientation of the automobile using the SLAM technique and the generation of the three-dimensional map of the environment. For example, the three-dimensional map may be a combination of point group data and color information, or may be a set of key frame information having a depth map and color information and associated with the position/orientation in the environment.

Processing performed by the system according to this embodiment will be described next with reference to the flowchart of FIG. 3. In step S101, initialization processing is performed in the information processing apparatus 10 under the control of the control unit 199. In the initialization processing, for example, the generation unit 105 reads out model data from the holding unit 101, and the calculation unit 110 reads out the internal parameters of the image capturing unit 11. Thus, in the initialization processing, each functional unit reads out or sets the data to be used by itself to execute processing. The timing to start the initialization processing is, for example, the time when the driver of the automobile 1 starts control of the automobile 1 or when the mode is switched from the manual driving mode to the automated driving mode.

Figure 4:
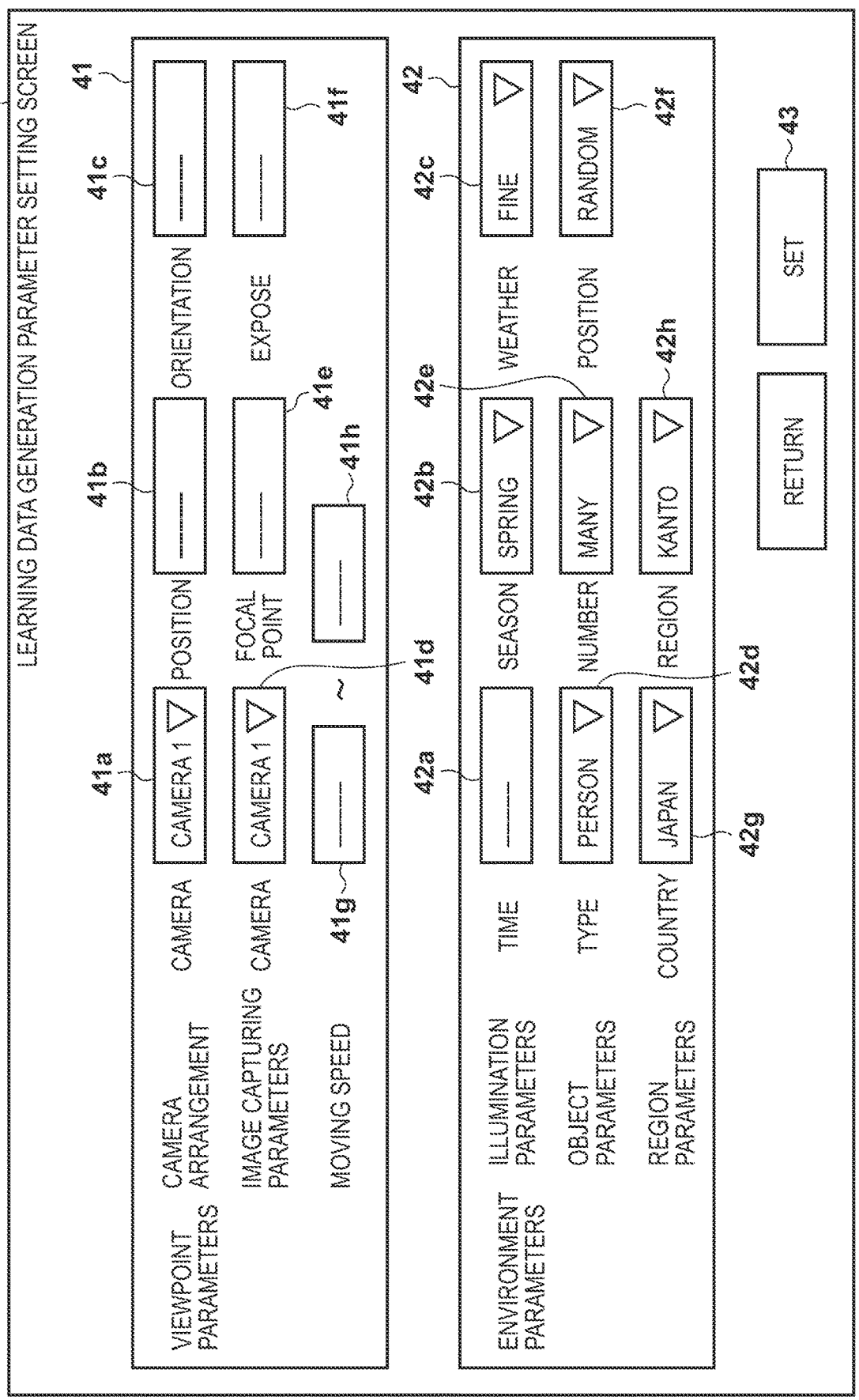
FIG. 4 is a view showing an example of the structure of a GUI 400.

In step S102, the display control unit 102 displays, on the display screen of the display unit 12, a GUI (Graphical User Interface) configured to cause the driver or passenger in the automobile 1 to set the viewpoint parameters and the environment parameters. FIG. 4 shows an example of the structure of a GUI 400 displayed on the display unit 12 in step S102.

In the GUI 400, a region 41 is a region in which operation units used to set the viewpoint parameters are arranged, and a region 42 is a region in which operation units used to set the environment parameters are arranged.

The region 41 will be described first. A tab 41a is used to select a virtual viewpoint as a target to set the arrangement parameters. For example, when the user designates the tab 41a on the display screen, the names of virtual viewpoints for which the arrangement parameters can be set are displayed in a list, and the user designates the name of a virtual viewpoint to set the arrangement parameters from the names displayed in the list. In FIG. 4, the virtual viewpoint "camera 1" is designated.

A region 41b is a region used to input the position of the virtual viewpoint in the virtual space. For example, when the user designates the region 41b on the display screen, a user interface used to input a numerical value is displayed on the display screen, and the user inputs a position (numerical value) to the region 41b using the user interface. The position input to the region 41b is a position on the coordinate system based on the automobile 1 serving as a reference and is preferably almost the same position as the position of the image capturing unit 11 (in particular, a position having almost the same height as the image capturing unit 11).

A region 41c is a region used to input the orientation of the virtual viewpoint in the virtual space. For example, when the user designates the region 41c on the display screen, a user interface used to input a numerical value is displayed on the display screen, and the user inputs an orientation (numerical value) to the region 41c using the user interface. The orientation input to the region 41c is an orientation on the coordinate system based on the automobile 1 serving as a reference and is preferably almost the same orientation as the orientation of the image capturing unit 11 (in particular, an orientation in which the visual axis direction of the image capturing unit 11 and that of the virtual viewpoint become almost the same). The arrangement parameters included in the viewpoint parameters can be set by the tab 41a and the regions 41b and 41c.

A tab 41d is used to select a virtual viewpoint as a target to set the image capturing parameters. For example, when the user designates the tab 41d on the display screen, the names of virtual viewpoints for which the image capturing parameters can be set are displayed in a list, and the user designates the name of a virtual viewpoint to set the image capturing parameters from the names displayed in the list. In FIG. 4, the virtual viewpoint "camera 1" is designated.

A region 41e is a region used to input the focal length of the virtual viewpoint. For example, when the user designates the region 41e on the display screen, a user interface used to input a numerical value is displayed on the display screen, and the user inputs a focal length (numerical value) to the region 41e using the user interface.

A region 41f is a region used to input the exposure time of the virtual viewpoint. For example, when the user designates the region 41f on the display screen, a user interface used to input a numerical value is displayed on the display screen, and the user inputs an exposure time (numerical value) to the region 41f using the user interface. The image capturing parameters included in the viewpoint parameters can be set by the tab 41d and the regions 41e and 41f.

A region 41g is a region used to input the lower limit of the moving speed of the virtual viewpoint. For example, when the user designates the region 41g on the display screen, a user interface used to input a numerical value is displayed on the display screen, and the user inputs the lower limit (numerical value) of the moving speed to the region 41g using the user interface.

A region 41*h* is a region used to input the upper limit of the moving speed of the virtual viewpoint. For example, when the user designates the region 41*h* on the display screen, a user interface used to input a numerical value is displayed on the display screen, and the user inputs the upper limit (numerical value) of the moving speed to the region 41*h* using the user interface.

As the upper limit/lower limit of the moving speed, the upper limit/lower limit of the range of the speed at which the driver of the automobile 1 often drives may be input, or the maximum speed that the automobile 1 can attain may be input as the upper limit of the moving speed. As the moving speed parameter included in the viewpoint parameters, one of speeds within the range from the upper limit to the lower limit of the moving speed (for example, one of moving speeds at an interval of 10 km/h from the upper limit to the lower limit of the moving speed) is set.

The region 42 will be described next. A region 42*a* is a region used to input a time. For example, when the user designates the region 42*a* on the display screen, a user interface used to input a numerical value is displayed on the display screen, and the user inputs a time (numerical value) to the region 42*a* using the user interface. Alternatively, a time zone such as morning, daytime, evening, or night may be input to the region 42*a* or may be select at the region 42*b*.

A tab 42*b* is used to select a season. For example, when the user designates the tab 42*b* on the display screen, four seasons, that is, spring, summer, autumn, and winter are displayed in a list, and the user designates one of the four seasons (spring, summer, autumn, and winter) displayed in the list. In FIG. 4, the season "spring" is designated.

A tab 42*c* is used to select the weather state. For example, when the user designates the tab 42*c* on the display screen, a list of weather states such as fine, cloudy, rain, and snow is displayed, and the user designates one weather state from the list. In FIG. 4, the weather state "fine" is designated. The illumination parameters included in the environment parameters can be set by the region 42*a* and the tabs 42*b* and 42*c*.

A tab 42*d* is used to select the type of a model to be arranged in the virtual space. For example, when the user designates the tab 42*d* on the display screen, types of models that can be arranged in the virtual space are displayed in a list, and the user designates one type from the list. In FIG. 4, the type "person" is designated.

A tab 42*e* is used to select the number of models designated by the tab 42*d* (the number of models to be arranged in the virtual space). For example, when the user designates the tab 42*e* on the display screen, a list for numbers of models to be arranged, that is, many, medium, few, and the like is displayed, and the user designates one item from the list. In FIG. 4, the item "many" is designated.

A tab 42*f* is used to select an arrangement method representing how to arrange the models designated by the tab 42*d*. For example, when the user designates the tab 42*f* on the display screen, model arrangement methods are displayed in a list, and the user designates one of the arrangement methods displayed in the list. In FIG. 4, the position "random" is designated. In the case of FIG. 4, since the type of a model to be arranged is "person", the number of models is "many", and the model arrangement method is "random", the generation unit 105 arranges many models of persons (in a number corresponding to "many") at random in the virtual space. The object parameters included in the environment parameters can be set by the tabs 42*d*, 42*e*, and 42*f*.

A tab 42*g* is used to select a country corresponding to the constructed virtual space. For example, when the user designates the tab 42*g* on the display screen, a list of countries is displayed, and the user designates one country from the list. In FIG. 4, the country "Japan" is designated.

A tab 42*h* is used to select a region in the country designated by the tab 42*g*. For example, when the user designates the tab 42*h* on the display screen, a list of regions is displayed, and the user designates one region from the list. In FIG. 4, the region "Kanto" is designated.

In the case of FIG. 4, since the country corresponding to the constructed virtual space is "Japan", and the region is "Kanto", the generation unit 105 arranges the models in accordance with rules corresponding to, for example, the country "Japan" and the region "Kanto". The region parameters included in the environment parameters can be set by the tabs 42*g* and 42*h*.

Note that the setting method of the information settable in the GUI 400 shown in FIG. 4 is not limited to the above-described method. For example, the position designation method is not limited to input of a numerical value, and, for example, one of representative positions in the virtual space may be selected. Additionally, for example, the orientation designation method is not limited to input of a numerical value, and, for example, one of representative orientations (for example, front, rear, right, and left) in the virtual space may be selected. Additionally, for example, the designation method of the number of models is not limited to the above-described method, and a detailed number may be input. Furthermore, the setting method of the viewpoint parameters and the environment parameters is not limited to the specific setting method. In addition, the user may input other parameters in addition to the above-described viewpoint parameters and environment parameters.

When the setting of the viewpoint parameters and the environment parameters using the above-described GUI 400 is completed, the user designates a button 43 on the display screen. When the button 43 is designated, the display control unit 102 removes the above-described GUI 400 from the display screen and sets the viewpoint parameters and the environment parameters based on the information input via the GUI 400. For example, the display control unit 102 sets the contents set in the tab 41*a* and the regions 41*b* and 41*c* to the arrangement parameters included in the viewpoint parameters. In addition, the display control unit 102 sets the contents set in the tab 41*d* and the regions 41*e* and 41*f* to the image capturing parameters included in the viewpoint parameters. Also, the display control unit 102 sets one speed of the speeds within the range from the upper limit input to the region 41*h* to the lower limit input to the region 41*g* to the moving speed parameter included in the viewpoint parameters. Additionally, for example, the display control unit 102 sets the contents set in the region 42*a* and the tabs 42*b* and 42*c* to the illumination parameters included in the environment parameters. Also, the display control unit 102 sets the contents set in the tabs 42*d*, 42*e*, and 42*f* to the object parameters included in the environment parameters. Furthermore, the display control unit 102 sets the contents set in the tabs 42*g* and 42*h* to the region parameters included in the environment parameters.

The display control unit 102 outputs the viewpoint parameters to the input unit 103 and outputs the environment parameters to the input unit 104. The input unit 103 outputs the viewpoint parameters received from the display control unit 102 to the generation unit 105, and the input unit 104 outputs the environment parameters received from the display control unit 102 to the generation unit 105.

In step S103, the generation unit 105 changes at least one of various kinds of parameters included in the viewpoint parameters and the environment parameters set on the GUI 400 to generate a plurality of sets of "viewpoint parameters and environment parameters", which are different from each other. For example, when changing the moving speed parameter, the moving speed parameter is changed within the range from the upper limit input to the region 41*h* to the lower limit input to the region 41*g*. Accordingly, a moving speed parameter corresponding to each of the plurality of moving speeds within the range from the upper limit input to the region 41*h* to the lower limit input to the region 41*g* can be generated, and, therefore, a viewpoint parameter corresponding to each of the plurality of moving speeds can be generated.

Note that the plurality of sets of "viewpoint parameters and environment parameters", which are different from each other, may be set by repetitively performing the above-described parameter setting using the GUI 400 a plurality of times. The generation unit 105 then generates a set of a virtual space image and geometric information as learning data for each set. Here, in an image captured by a camera with a higher moving speed, a blur that is stronger than in an image captured by a camera with a lower moving speed occurs. As described above, the virtual space image generated by the generation unit 105 is preferably similar to the appearance in the image captured by the image capturing unit 11 under the same conditions. For this reason, a blur according to the moving speed preferably occurs in the virtual space image as well. Hence, the generation unit 105 performs blurring processing (applies a blur) according to the corresponding moving speed for the virtual space image. Accordingly, for example, in a virtual space image from a virtual viewpoint of a higher moving speed, a blur stronger than in a virtual space image from a virtual viewpoint of a lower moving speed occurs, and the virtual space image is similar to the appearance in the image captured by the image capturing unit 11 under the same conditions.

In step S104, the generation unit 106 performs learning processing of learning models using the learning data generated by the generation unit 105. In step S105, the generation unit 106 stores the learning models learned in step S104 in the holding unit 107.

In step S106, the image capturing unit 11 outputs a captured image to the input unit 108 of the subsequent stage. In step S107, the input unit 108 acquires the captured image output from the image capturing unit 11, and output the acquired captured image to the estimation unit 109, the calculation unit 110, and the generation/updating unit 111 of the subsequent stage.

In step S108, the estimation unit 109 estimates geometric information from the captured image received from the input unit 108. In this estimation processing, the estimation unit 109 reads out a learning model stored in the holding unit 107 and acquires, as an estimation result, geometric information output from the learning model when the captured image received from the input unit 108 is input to the readout learning model. The estimation unit 109 outputs the geometric information to the calculation unit 110 and the generation/updating unit 111 of the subsequent stage.

In step S109, the calculation unit 110 obtains the position/orientation of the image capturing unit 11 using the captured image sent from the input unit 108 and the geometric information sent from the estimation unit 109, and converts the obtained position/orientation into the position/orientation of the automobile 1 using the above-described bias information. Then, the calculation unit 110 sends the converted position/orientation of the automobile 1 and the geometric information output from the estimation unit 109 to the driving control unit 13 and the generation/updating unit 111 of the subsequent stage.

The processing of step S110 is processing performed only when a setting to use the SLAM technique is done. If the setting to use the SLAM technique is not done, after step S109, the process skips step S110 and advances to step S111.

In step S110, the generation/updating unit 111 generates and updates a three-dimensional map in the environment in which the automobile 1 travels, using the captured image input from the input unit 108, the geometric information input from the estimation unit 109, and the position/orientation input from the calculation unit 110. The generation/updating unit 111 then outputs the generated/updated three-dimensional map to the calculation unit 110 and the driving control unit 13. The generation/updating unit 111 performs optimization processing for the three-dimensional map in each processing or at a predetermined timing (for example, once in several times), and the three-dimensional map gradually changes to an accurate map.

Note that when the setting to use the SLAM technique is done, the calculation unit 110 may calculate the position/orientation of the image capturing unit 11 using the SLAM technique using the three-dimensional map generated/updated by the generation/updating unit 111 as well in addition to the geometric information from the estimation unit 109.

In step S111, the driving control unit 13 decides the rotation torques of the wheels of the automobile 1 and the advancing direction of the automobile 1 based on the geometric information output from the calculation unit 110 or the three-dimensional map output from the generation/updating unit 111 and the position/orientation output from the calculation unit 110. First, the driving control unit 13 recognizes the surrounding environment of the position of the automobile 1 (the position output from the calculation unit 110) in a space having a geometric shape represented by the geometric information output from the calculation unit 110 or the three-dimensional map output from the generation/updating unit 111. Recognizing the surrounding environment of the position of the automobile 1 means, for example, recognizing what kind of object exists in which direction at which distance from the automobile 1. Furthermore, a result of recognizing the types, numbers, and positions/orientations of objects (for example, objects existing in the environment in which the automobile 1 travels, such as roads, signs, traffic signals, buildings, natural objects, persons, animals, automobiles, bicycles, and the like) on the periphery of the automobile 1 by an surrounding environment recognition unit (not shown) may be received as the surrounding environment.

Then, the driving control unit 13 obtains, from the position/orientation of the automobile 1 and the surrounding environment of the automobile 1, driving control information to automatically or semi-automatically drive on the road in accordance with traffic information (signs and traffic signals) while avoiding obstacles such as other vehicles and persons, and outputs the driving control information. The driving control information is information including the rotation torques of the wheels of the automobile 1 and the advancing direction. The driving control information may also include the brake, the direction of the blinker, and the like. As described above, the driving control information is information used to control the automobile 1 to implement automated driving or semi-automated driving of the automobile 1, and the pieces of information included in the driving control information are not limited to specific information.

The driving control unit 13 sends the obtained driving control information to the display unit 12 and the actuator unit 14. The driving control information of the automobile 1 is thus displayed on the display screen of the display unit 12 as characters or images.

In step S112, the actuator unit 14 controls driving of the wheels of the automobile 1 in accordance with the driving control information from the driving control unit 13. Note that map information stored in a map information storage unit (not shown) may be used for the driving control of the automobile 1.

Figure 3:
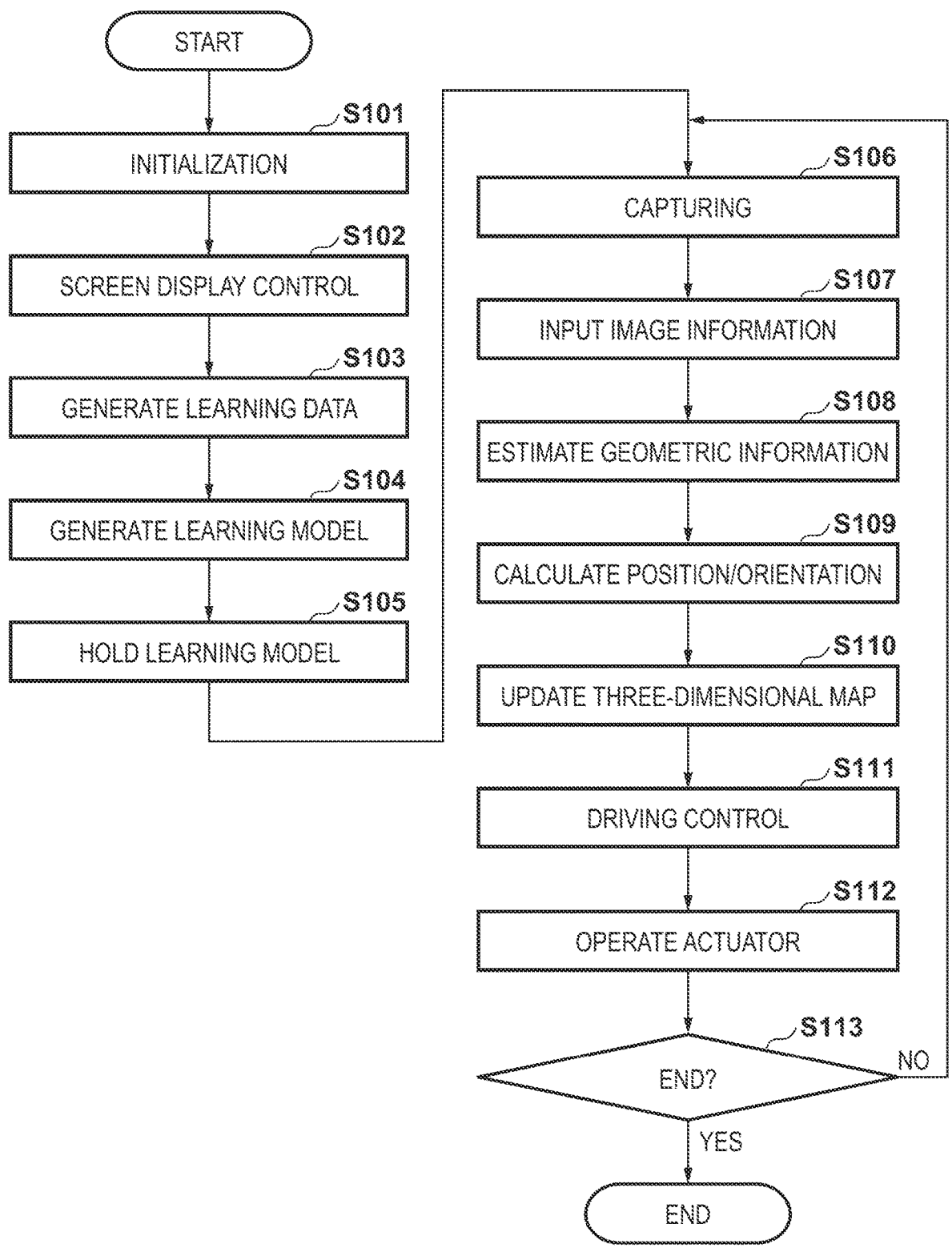
FIG. 3 is a flowchart of processing performed by the system.

In step S113, the control unit 199 determines whether the end condition of the processing according to the flowchart of FIG. 3 is satisfied. For example, if the automobile 1 has arrived at the destination, or the driver or passenger in the automobile 1 instructs stop of the system on the display screen of the display unit 12, the control unit 199 determines that the end condition is satisfied. As the result of the determination, if the end condition is satisfied, the processing according to the flowchart of FIG. 3 ends. If the end condition is not satisfied, the process returns to step S106.

Note that in FIG. 3, the processes of steps S111 and S112 are executed between step S110 and step S113. However, the processes of steps S111 and S112 may be executed in parallel to the processing according to the flowchart of FIG. 3. As described above, in the following embodiments and modifications as well including this embodiment, the process of each processing step shown in a flowchart need not always be executed in the order shown in the flowchart, and the execution order may be changed depending on the processing step. In addition, some processing steps may be executed in parallel to the other processing steps.

As described above, in this embodiment, the viewpoint parameters and the environment parameters are appropriately set, and the appearance of a scene in a virtual space image used in learning of a learning model is made similar to the appearance of a scene included in a captured image obtained by the image capturing unit. When the learning model learned using such a "virtual space image whose scene appearance is similar to that of the captured image obtained by the image capturing unit" is used, geometric information corresponding to the captured image actually captured by the image capturing unit can be estimated more accurately.

<First Modification>

In the first embodiment, a depth map is used as geometric information. However, the geometric information may be any information as long as it is information representing the geometric shape of the virtual space visible from a virtual viewpoint.

Additionally, in the first embodiment, the automobile 1 is used as an example of a vehicle. However, the first embodiment is similarly applicable even if a vehicle other than the automobile 1 is used in place of the automobile 1.

Also, in the first embodiment, the viewpoint parameters and the environment parameters are input by the user via the GUI 400. However, the present invention is not limited to this. For example, the input units 103 and 104 may acquire viewpoint parameters and environment parameters created and registered in advance in a device (a memory, a server, or the like) provided in or outside the information processing apparatus 10, respectively, and output them to the generation unit 105.

<Second Modification>

The image capturing unit 11 is not limited to the RGB color camera and may be a grayscale camera or an infrared camera. In addition, the place to arrange the image capturing unit 11 is not limited to the back side of the windshield and may be the upper outer side of the automobile 1, the front outer side or inner side, or a side mirror portion of the automobile 1. A plurality of image capturing units 11 may be provided and arranged in the automobile 1 so as to capture not only the front side with respect to the advancing direction of the automobile 1 but also diagonal front sides, lateral sides, diagonal rear sides, and the rear side.

<Third Modification>

As described above, the display unit 12 need not always include a touch panel screen and may be, for example, an HUD (Head-Up Display) provided on the windshield or dashboard of the automobile 1.

<Fourth Modification>

As described above, various data can be applied to model data. For example, a combination of color information and distance data (point group data) in an actual environment obtained using a three-dimensional measurement unit or an image capturing unit may be used as model data. Alternatively, key frame information including color information and a depth map obtained using a three-dimensional measurement unit or an image capturing unit and associated with the position/orientation in the environment may be used as model data.

<Fifth Modification>

As described above, the input method of the viewpoint parameters and the environment parameters to the information processing apparatus 10 is not limited to a specific input method. For example, the arrangement parameters and the image capturing parameters included in the viewpoint parameters may be set in advance in the information processing apparatus 10 based on the maker, model number, or arrangement information of the automobile 1 or the image capturing unit 11, or may be acquired from the image capturing unit 11 and set in the information processing apparatus 10. Alternatively, parameters set in advance in the information processing apparatus 10 or acquired from the image capturing unit 11 may be displayed as initial values in corresponding portions of the GUI 400.

In addition, the height (the distance in the vertical direction) of the image capturing unit 11 from the road surface may be acquired using an image captured by the image capturing unit 11 or a gravity direction sensor mounted on the image capturing unit 11 or the automobile 1, and the acquired height may be set as the height of the virtual viewpoint from the road surface in the virtual space.

In addition, the illumination parameters and the object parameters included in the environment parameters may be obtained by recognizing an object existing in the scene based on the image captured by the image capturing unit 11, the geometric information estimated by the estimation unit 109, and the three-dimensional map generated by the generation/updating unit 111. To recognize the object, deep learning represented by machine learning or a CNN may be used. In addition, the illumination parameters and the object parameters may be set in advance in all combinations. Furthermore, the region parameters may be set based on a current position measured using GPS information, or may be set by a person in charge at an automobile dealer.

Additionally, in the first embodiment, learning data is generated based on the viewpoint parameters and the environment parameters. However, parameters other than the viewpoint parameters and the environment parameters may be used to generate learning data. As the parameters other than the viewpoint parameters and the environment parameters, parameters concerning the driver of the automobile 1 may be used. For example, a time, place, speed, and the like to drive the automobile 1 often may be input via a user interface such as the GUI 400 by the driver or passenger in the automobile 1. Alternatively, the driving situation of the automobile 1 may be held in a storage medium, and the driving situation may be read out from the storage medium. If the user parameters such as a time, place, and speed to drive often by the driver of the automobile 1 are known, the generation unit 105 can generate learning data suitable for the user using the parameters, and, therefore, the estimation accuracy of the position/orientation improves. This also applies to the other embodiments and modifications, and other parameters may further be used in addition to the viewpoint parameters and the environment parameters.

<Sixth Modification>

The use purpose of the position/orientation of the image capturing unit 11 estimated by the information processing apparatus 10 is not limited to automated driving of the automobile. That is, the information processing apparatus 10 may be applied to a field in which it is required to more accurately acquire the surrounding environment or position/orientation of the image capturing unit 11 or the apparatus including the image capturing unit 11 based on the captured image obtained by the image capturing unit 11.

For example, the calculated position/orientation, the estimated geometric information, and the generated three-dimensional map can be applied to, for example, driving assist (semiautomated driving) of the automobile or display of the situation of driving of the automobile by a person. They may be used for moving control of a moving body such as a conveying vehicle (AGV (Automated Guided Vehicle)) that travels in a factory or a distribution warehouse in accordance with a process. Alternatively, they may be used for moving control of a service robot that autonomously acts in a home or the alignment between the physical space and a virtual object in mixed reality/augmented reality.

<Seventh Modification>

The learning model is not limited to a CNN and may be, for example, a model of machine learning or may be a model of reinforcement learning. Note that as the learning data, data (for example, a set of an image and geometric information) corresponding to the learning processing of the learning model to be used is used.

Second Embodiment

In the following embodiments and modifications including this embodiment, the differences from the first embodiment will be described. The rest is assumed to be the same as in the first embodiment unless it is specifically stated otherwise. In this embodiment, the physical space is measured/captured by an automobile 2 different from an automobile 1 including an information processing apparatus 10 to generate the model data of the physical space, and the model data is registered in a holding unit 101 of the information processing apparatus 10.

An example of the functional arrangement of a system according to this embodiment will be described with reference to the block diagram of FIG. 5. Note that the functional arrangement of the information processing apparatus 10 in FIG. 5 is the same as in the first embodiment (FIG. 2), and components other than the holding unit 101 are not illustrated.

Figure 5:
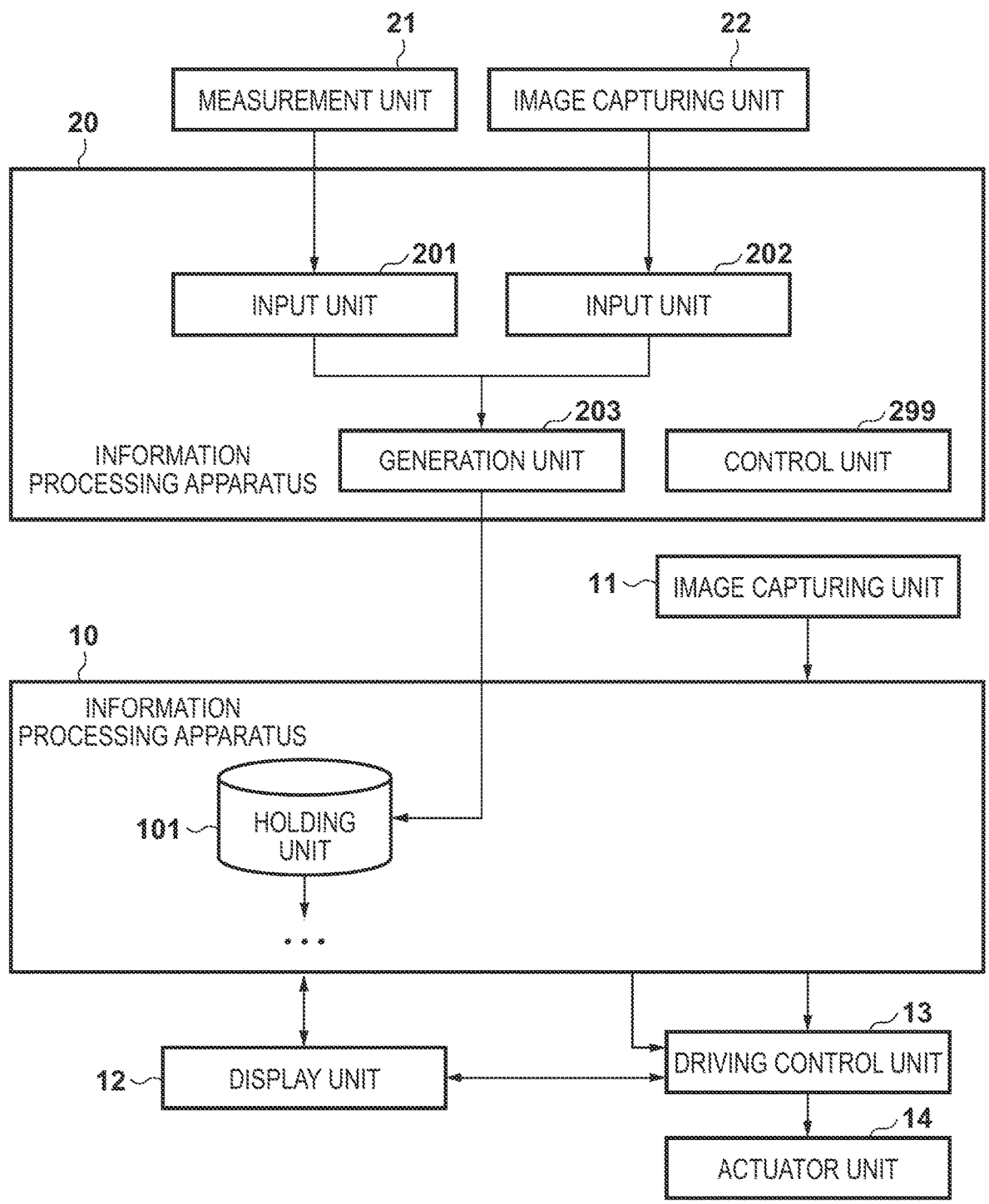
FIG. 5 is a block diagram showing an example of the functional arrangement of a system.

Referring to FIG. 5, a measurement unit 21, an image capturing unit 22, and an information processing apparatus 20 are mounted in the above-described automobile 2. Here, the arrangement position/orientation of the image capturing unit 22 of the automobile 2 is different from the arrangement position/orientation of an image capturing unit 11 of the automobile 1. In addition, the automobile 2 travels through the same places as the automobile 1 on a day different from that of the automobile 1 or at a time different from that of the automobile 1 and performs measurement and image capturing to be described later. It is assumed that the situation of the scene to travel through is somewhat different. In addition, the users of the automobiles 1 and 2 may be different.

The measurement unit 21 is a sensor attached to the upper portion of the automobile 2 and configured to measure (three-dimensionally measure) distance information formed by a point group representing the geometric shape of the periphery (entire periphery) of the automobile 2. The measurement unit 21 performs three-dimensional measurement of a scene in an environment in which the automobile 2 travels and outputs the result of the three-dimensional measurement as distance information to the information processing apparatus 20. The measurement unit 21 is, for example, an active range sensor represented by a Lidar. Note that the relative position/orientation relationship between the automobile 2 and the measurement unit 21 is calibrated in advance, and the relative position/orientation relationship is registered as known information (bias information) in the information processing apparatus 20.

The image capturing unit 22 is an image capturing device configured to capture a movie of the scene in the environment in which the automobile 2 travels and is, for example, an RGB color camera. The image (captured image) of each frame of the movie captured by the image capturing unit 22 is output to the information processing apparatus 20. A plurality of image capturing units 22 are radially attached to the upper portion of the automobile 2 and thus capture images of the periphery (entire periphery) of the automobile 2. Note that the relative position/orientation relationship between the automobile 2 and the image capturing unit 22 is calibrated in advance, and the relative position/orientation relationship is registered as known information (bias information) in the information processing apparatus 20. In addition, the relative position/orientation relationship between the measurement unit 21 and the image capturing unit 22 is calibrated in advance, and the relative position/orientation relationship is registered as known information (bias information) in the information processing apparatus 20.

The information processing apparatus 20 will be described next. A control unit 299 controls the operation of the entire information processing apparatus 20. An input unit 201 acquires distance information output from the measurement unit 21 and outputs the acquired distance information to a generation unit 203 of the subsequent stage. An input unit 202 acquires a captured image output from the image capturing unit 22 (each of the plurality of image capturing units 22) and outputs the acquired captured image to the generation unit 203 of the subsequent stage.

The generation unit 203 generates the model data of the environment in which the automobile 2 travels, using the distance information output from the input unit 201 and the captured image output from the input unit 202. In the model data generated by the generation unit 203, each point in the point group represented by the distance information is given the color information of a corresponding pixel in the captured image in association. Since the relative position/orientation relationship between the measurement unit 21 and the image capturing unit 22 is known, each point in the point group represented by the distance information and the color information corresponding to the point in the captured image can be associated.

The model data generated by the generation unit 203 is held by the holding unit 101. As the method of storing the model data generated by the generation unit 203 in the holding unit 101, various methods can be considered.

For example, the information processing apparatus 10 and the information processing apparatus 20 may be connected via a wired/wireless network (the Internet or a Wi-Fi communication network), and the generation unit 203 may transmit the generated model data to the information processing apparatus 10 via the network. In this case, a control unit 199 of the information processing apparatus 10 stores, in the holding unit 101, the model data transmitted from the information processing apparatus 20.

In addition, the model data generated by the generation unit 203 may be output not to the information processing apparatus 10 but to a memory device such as a USB memory. In this case, when the user connects the memory device to the information processing apparatus 10 and performs an operation input to transfer the model data to the holding unit 101, the control unit 199 reads out the model data from the memory device and stores it in the holding unit 101.

Figure 6:
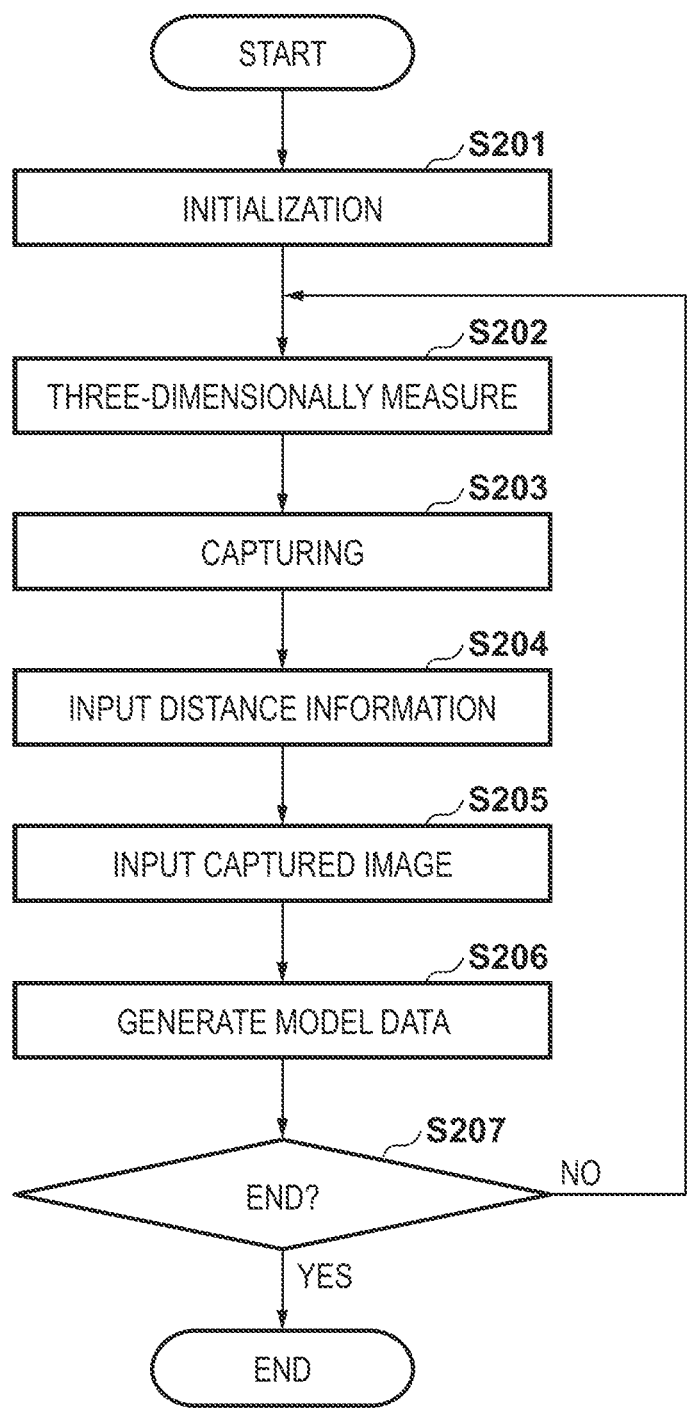
FIG. 6 is a flowchart of processing performed by an information processing apparatus 20 to generate model data.

Processing performed by the information processing apparatus 20 to generate model data will be described next with reference to FIG. 6 that shows the flowchart of the processing. Note that the processing according to the flowchart of FIG. 6 is processing performed before the start of processing according to the flowchart of FIG. 3.

In step S201, the control unit 299 performs initialization processing of, for example, loading the parameters (sensor parameters) of the measurement unit 21, the parameters (camera parameters) of the image capturing unit 22, data to be used in each functional unit in each of the following processes, and the like. The timing to start the initialization processing is, for example, the time when the user starts control of the automobile 2.

In step S202, the measurement unit 21 three-dimensionally measures the scene of the periphery (entire periphery) of the automobile 2 to generate distance information, and outputs the generated distance information to the information processing apparatus 20.

In step S203, the image capturing unit 22 (each image capturing unit 22) captures the periphery (entire periphery) of the automobile 2, and outputs a captured image obtained by the image capturing to the information processing apparatus 20.

In step S204, the input unit 201 acquires the distance information output from the measurement unit 21 and outputs the acquired distance information to the generation unit 203. In step S205, the input unit 202 acquires the captured image output from the image capturing unit 22 and outputs the acquired captured image to the generation unit 203.

In step S206, the generation unit 203 generates the model data of the environment in which the automobile 2 travels, using the distance information output from the input unit 201 and the captured image output from the input unit 202.

In step S207, the control unit 299 determines whether the end condition of the system is satisfied. For example, if the user instructs stop of the system of the automobile 2, the control unit 299 determines that the end condition is satisfied. As the result of the determination, if the end condition is satisfied, the processing according to the flowchart of FIG. 6 ends. On the other hand, if the end condition is not satisfied, the process returns to step S202.

When the processes of steps S202 to S206 are repetitively performed during travel of the automobile 2, the model data of the entire scene in which the automobile 2 travels can be generated by compositing the model data generated in step S206. The composition of the model data is performed by compositing the model data on the same coordinate system while associating the pieces of distance information (point groups) with each other.

As described above, according to this embodiment, even in a case in which the system (for example, the automobile 1) including the information processing apparatus 10 and the system (for example, the automobile 2) including the information processing apparatus 20 use different viewpoint parameters and environment parameters, the parameters can appropriately be set. Then, the appearance of the scene of the image used to generate the learning model and the appearance of the scene included in the input image captured by the image capturing unit are similar. As a result, it is possible to accurately calculate the position/orientation to be applied to automated driving of the automobile or the like.

<First Modification>

In the model data according to this embodiment, each point in the point group represented by the distance information is given the color information of a corresponding pixel in the captured image in association. However, the present invention is not limited to this. For example, in the model data, each point in the point group represented by the distance information may be given the color information of a corresponding pixel in a texture created in advance. Alternatively, for example, in the model data, the polygon or point group of an object generated in advance may be associated with the color information of a corresponding pixel in a captured image.

<Second Modification>

In the model data according to this embodiment, each point in the point group represented by the distance information is given the color information of a corresponding pixel in the captured image in association. However, the present invention is not limited to this. For example, the model data may be key frame information including a depth map generated based on color information and the distance information obtained using the measurement unit 21 or the image capturing unit 22 and the color information and associated with the position/orientation in the environment. The position/orientation in the environment can be obtained using, for example, a GPS.

<Third Modification>

In this embodiment, a plurality of captured images obtained by capturing the periphery (entire periphery) of the automobile 2 by the plurality of image capturing units 22 are acquired. However, if a camera capable of performing panoramic image capturing is used as the image capturing unit 22, a captured image obtained by the panoramic image capturing by the image capturing unit 22 may be acquired. In addition, a plurality of cameras capable of performing panoramic image capturing may be mounted in the automobile 2, or the camera may be mounted in combination with a camera that performs normal image capturing.

<Fourth Modification>

The model data described in the first embodiment may be stored in the holding unit 101 and used to generate a virtual space image and geometric information, and the model data in the holding unit 101 may be replaced with the model data generated by the information processing apparatus 20 later. The timing to "replace the model data in the holding unit 101 with the model data generated by the information processing apparatus 20" is, for example, "when model data within a predetermined range is generated by the information processing apparatus 20". This raises the accuracy of position/orientation estimation.

Third Embodiment

Figure 7:
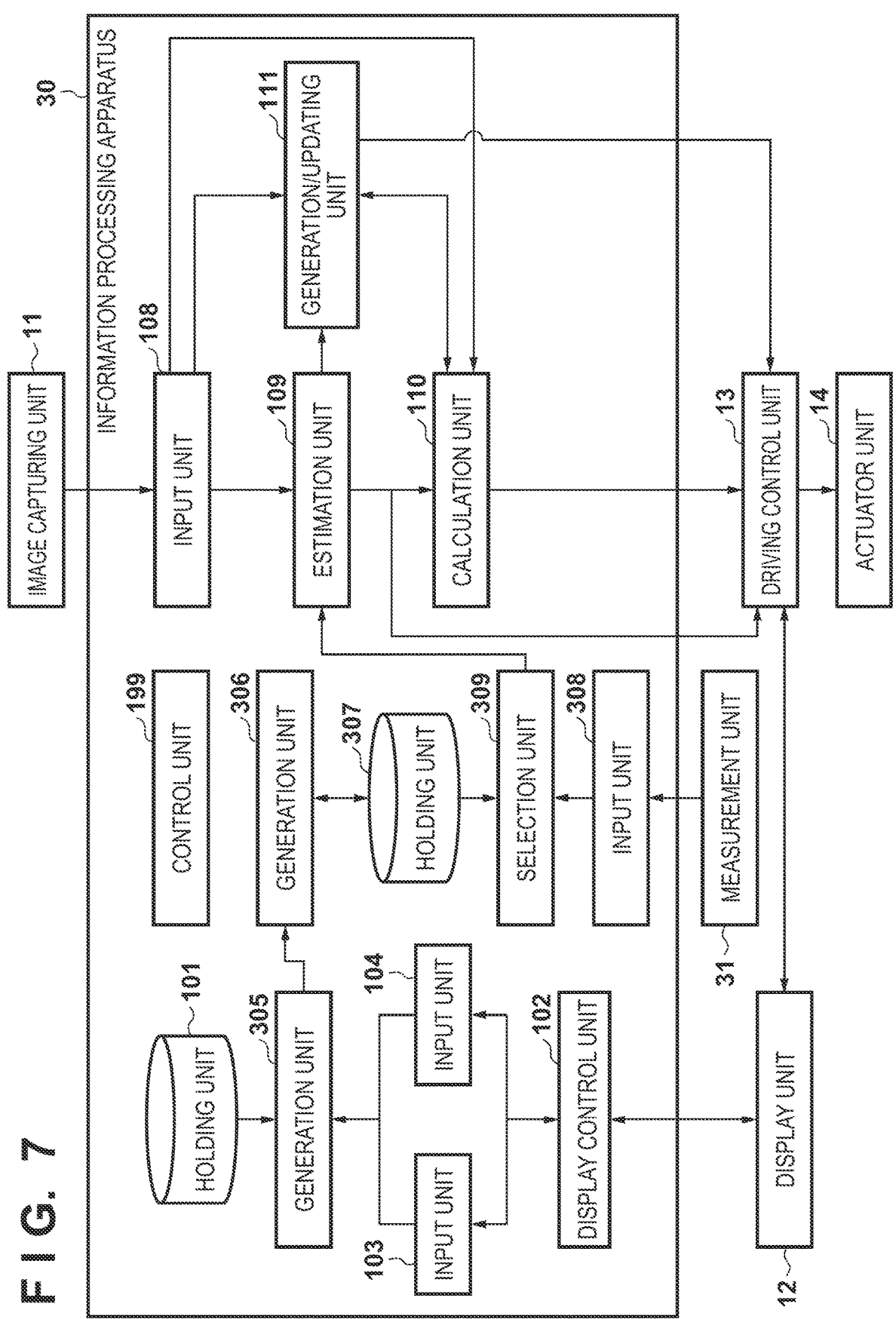
FIG. 7 is a block diagram showing an example of the functional arrangement of a system.

In this embodiment, a learning model is generated for each situation. When estimating geometric information from a captured image, the estimation is performed using a learning model corresponding to the situation at the time of estimation. An example of the functional arrangement of a system according to this embodiment will be described with reference to the block diagram of FIG. 7.

A measurement unit 31 is a sensor configured to measure, as measurement parameters, parameters concerning the viewpoint (image capturing unit 11) of an automobile 1 at the time of travel of the automobile 1, parameters concerning the environment, or other parameters.

The parameters concerning the viewpoint of the automobile 1 include, for example, arrangement parameters, image capturing parameters, and a moving speed parameter. The arrangement parameters include parameters such as the position/orientation of the image capturing unit 11 (or the height of the image capturing unit 11 from the attachment position) on a coordinate system based on the automobile 1 serving as a reference and the number of image capturing units 11. The image capturing parameters include the internal parameters of the image capturing unit 11 such as the focal length and the principal point of the image capturing unit 11 and parameters such as the exposure time and the focus position of the image capturing unit 11. The moving speed parameter is a parameter representing the moving speed of the image capturing unit 11 (automobile 1).

On the other hand, the environment parameters are parameters concerning the environment in which the automobile 1 travels, and include, for example, illumination parameters, object parameters, and region parameters. The illumination parameters are parameters for defining illumination conditions that change based on changes in time, season, weather state, and the like. The object parameters are parameters concerning the types, number, positions, orientations, sizes, and the like of objects (for example, objects existing in the environment in which the automobile 1 travels, such as roads, signs, traffic signals, buildings, natural objects, persons, animals, automobiles, bicycles, and the like) in the environment in which the automobile 1 travels. The region parameters are parameters such as the names and positions of a country, a place, and a region in which the automobile 1 travels.

A generation unit 305 is different from the generation unit 105 in the following points. That is, the generation unit 305 generates a plurality of learning data, like the generation unit 105, but generates a set of a plurality of learning data for each predetermined situation. For example, assume that the upper limit input to a region 41h is "150 km/h", and the lower limited input to a region 41g is "0 km/h". At this time, the generation unit 305 generates learning data, like the generation unit 105, using the viewpoint parameters, the environment parameters, and the model data for each viewpoint parameter including a moving speed parameter included in the speed range of "0 km/h to 49 km/h". At this time, when other parameters are also changed, learning data corresponding to a combination of various parameters can be generated. In the same way, the generation unit 305 generates learning data, like the generation unit 105, using the viewpoint parameters, the environment parameters, and the model data for each viewpoint parameter including a moving speed parameter included in the speed range of "50 km/h to 99 km/h". Furthermore, the generation unit 305 generates learning data, like the generation unit 105, using the viewpoint parameters, the environment parameters, and the model data for each viewpoint parameter including a moving speed parameter included in the speed range of "100 km/h to 150 km/h". The generation unit 305 can thus generate a set of a plurality of learning data for each situation.

A generation unit 306 performs, for each situation, learning of a learning model using the set of the plurality of learning data generated by the generation unit 305 for the situation, like the generation unit 106, thereby generating a learning model for each predetermined situation. In the above-described example, a plurality of learning models such as a learning model corresponding to the speed range of "0 km/h to 49 km/h", a learning model corresponding to the speed range of "50 km/h to 99 km/h", and a learning model corresponding to the speed range of "100 km/h to 150 km/h" are generated. The generation unit 306 stores the learning model generated for each predetermined situation in a holding unit 307.

An input unit 308 acquires the measurement parameters output from the measurement unit 31 and outputs the acquired measurement parameters to a selection unit 309. The selection unit 309 selects, as a selected learning model, one of the learning models held by the holding unit 307, which corresponds to the measurement parameters output from the input unit 308, and outputs the selected learning model to an estimation unit 109. The estimation unit 109 estimates geometric information corresponding to a captured image from the image capturing unit 11 using the learning model output from the selection unit 309.

For example, assume that the moving speed parameter included in the measurement parameters is "30 km/h". At this time, the selection unit 309 selects a learning model corresponding to "0 km/h to 49 km/h" including "30 km/h" of the learning models corresponding to "0 km/h to 49 km/h", "50 km/h to 99 km/h", and "100 km/h to 150 km/h". Then, the selection unit 309 outputs the learning model corresponding to "0 km/h to 49 km/h" to the estimation unit 109, and the estimation unit 109 estimates geometric information corresponding to a captured image from the image capturing unit 11 using the learning model corresponding to "0 km/h to 49 km/h".

As the moving speed of the automobile 1 increases, a blur with a strength corresponding to the moving speed occurs in the captured image obtained by the image capturing unit 11. Preparing a plurality of learning models corresponding to moving speeds means generating learning data including a blur corresponding to each moving speed and generating learning models capable of coping with various blurs. Hence, when a learning model suitable for the actual moving speed of the automobile 1 is selected, the position/orientation can accurately be calculated.

Note that in the above-described example, the learning model is selected based on the moving speed parameter. However, the learning model may be selected based on other parameters. For example, when a learning model is generated for each illumination condition, a learning model corresponding to an illumination condition similar to the illumination condition represented by the measurement parameters may be selected. Additionally, for example, when a learning model is generated for each of a plurality of illumination conditions, the learning model may be selected in the following way. A display control unit 102 displays, on the display screen of a display unit 12, a list of a plurality of illumination conditions similar to the illumination condition represented by the measurement parameters in the plurality of illumination conditions and prompts the driver or passenger in the automobile 1 to select one illumination condition from the list. The selection unit 309 selects a learning model corresponding to the one illumination condition selected from the list by the driver or passenger in the automobile 1.

Figure 8:
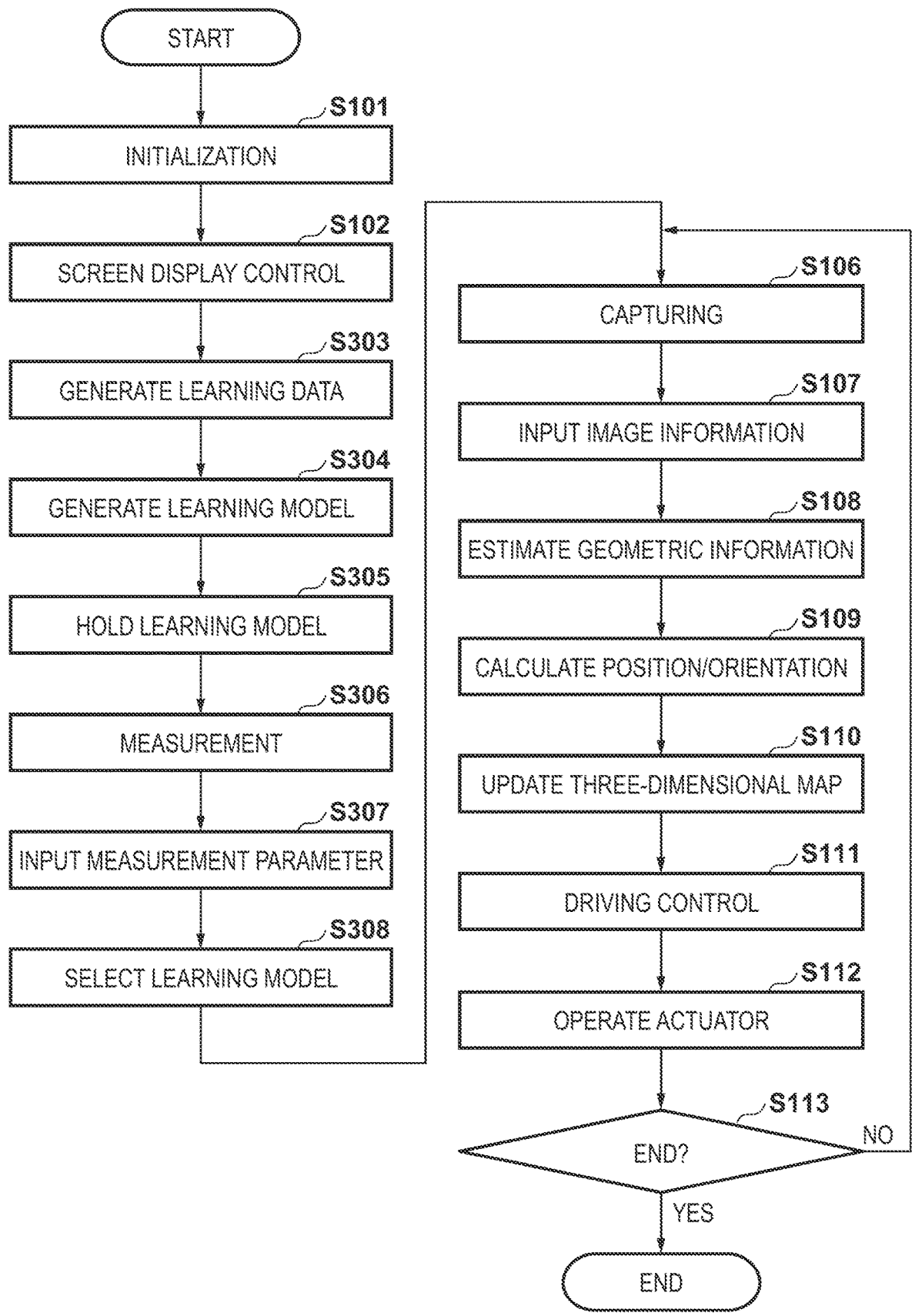
FIG. 8 is a flowchart of processing performed by the system.

Processing performed by the system according to this embodiment will be described next with reference to FIG. 8 that shows the flowchart of the processing. Note that the same step numbers as in FIG. 3 denote the same processing steps in FIG. 8, and a description thereof will be omitted.

In step S303, the generation unit 305 generates a set of a plurality of learning data for each predetermined situation. In step S304, the generation unit 306 performs, for each predetermined situation, learning of a learning model using the plurality of learning data generated by the generation unit 305 for the situation, thereby generating a learning model for each predetermined situation. In step S305, the generation unit 306 stores, in the holding unit 307, the learning model corresponding to each situation learned in step S304.

In step S306, the measurement unit 31 measures, as the measurement parameters, parameters concerning the viewpoint (image capturing unit 11) of the automobile 1 at the time of travel of the automobile 1, parameters concerning the environment, or other parameters and outputs the measurement parameters to the input unit 308.

In step S307, the input unit 308 acquires the measurement parameters output from the measurement unit 31 and outputs the acquired measurement parameters to the selection unit 309. In step S308, the selection unit 309 selects, as a selected learning model, one of the learning models held by the holding unit 307, which corresponds to the measurement parameters output from the input unit 308, and outputs the selected learning model to the estimation unit 109.

In step S108 according to this embodiment, the estimation unit 109 acquires, as an estimation result, geometric information output from the learning model when the captured image received from an input unit 108 is input to the selected learning model output from the selection unit 309. The estimation unit 109 outputs the geometric information to a calculation unit 110 and a generation/updating unit 111 of the subsequent stage.

As described above, according to this embodiment, since the geometric information is estimated using the learning model selected in accordance with the current situation, the geometric information is suitable for the captured image. As a result, it is possible to accurately calculate the position/orientation to be applied to automated driving of the automobile or the like.

<First Modification>

A plurality of learning models may be generated, for example, for at least one item of interest of items such as arrangement parameters, image capturing parameters, time, season, weather state, objects existing on the periphery, and a region, and a learning model corresponding to the value of the item of interest included in the measurement parameters may be selected.

Fourth Embodiment

In this embodiment, a system that generates, by learning processing, a learning model that receives a virtual space image, viewpoint parameters, and environment parameters and outputs geometric information and acquires corresponding geometric information by inputting a captured image and the measurement parameters to the learning model will be described.

Figure 9:
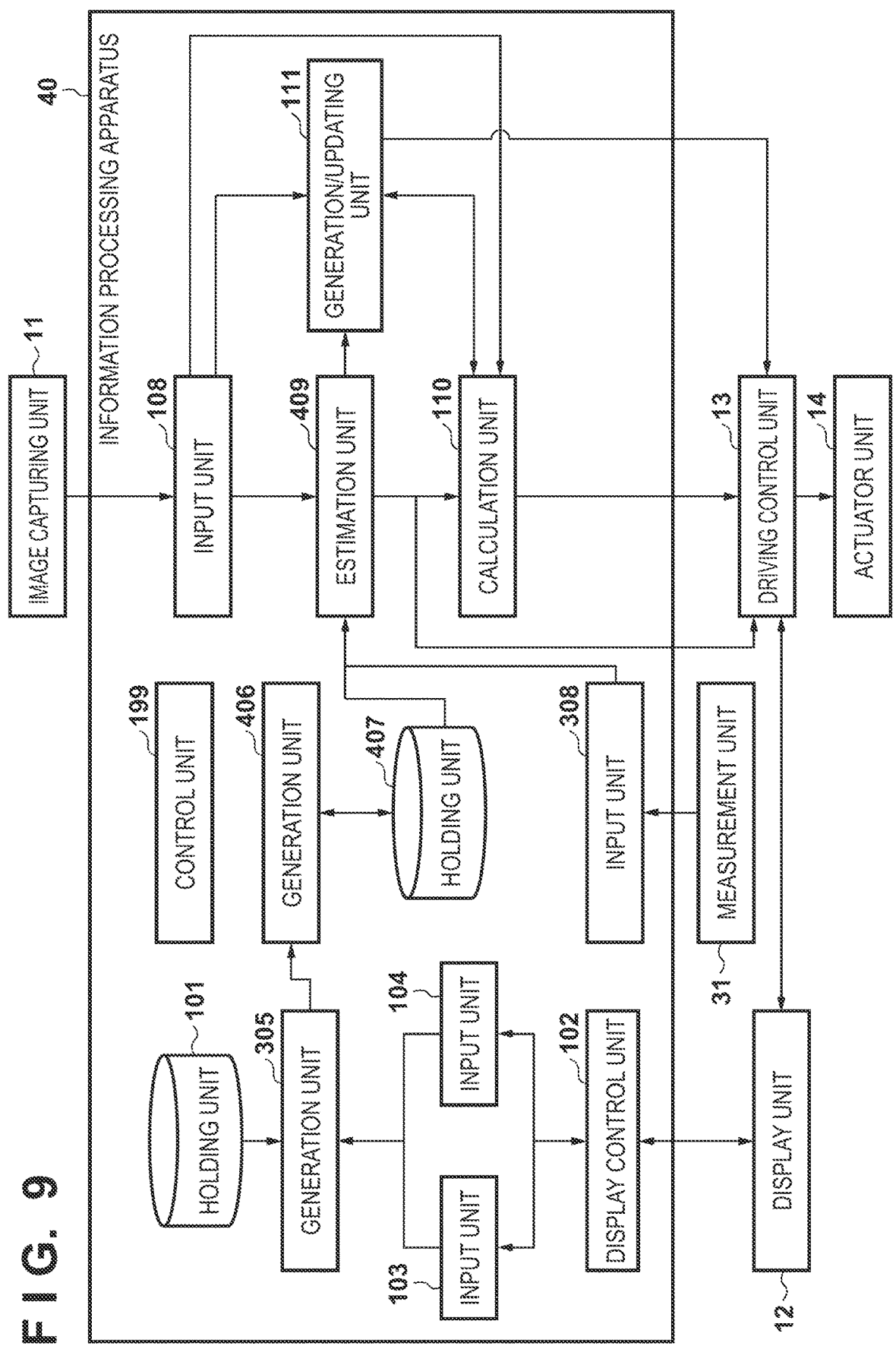
FIG. 9 is a block diagram showing an example of the functional arrangement of a system.

An example of the functional arrangement of the system according to this embodiment will be described first with reference to the block diagram of FIG. 9. The arrangement shown in FIG. 9 is different from that of the third embodiment in the following points.

A generation unit 305 generates and outputs a plurality of learning data for each situation, as in the third embodiment. However, the generation unit 305 outputs the learning data to which the viewpoint parameters and the environment parameters used to generate the learning data are attached.

A generation unit 406 performs learning processing of one learning model using each learning data output from the generation unit 305. At this time, the generation unit 406 uses, as inputs to the learning model, "a virtual space image, and viewpoint parameters and environment parameters which are used to generate the virtual space image" included in each learning data, and uses, as supervised data, "geometric information" included in each learning data. The learning model obtained by such learning processing learns the correspondence relationship between the set of "the virtual space image, and the viewpoint parameters and the environment parameters which are used to generate the virtual space image" and "the geometric information" corresponding to the set. Then, the generation unit 406 stores the learned learning model in a holding unit 407.

An input unit 308 sends the measurement parameters from a measurement unit 31 to an estimation unit 409. The estimation unit 409 reads out the learning model from the holding unit 407 and outputs geometric information output from the learning model when a captured image from an input unit 108 and the measurement parameters from the input unit 308 are input to the readout learning model.

For example, as the moving speed of an automobile 1 increases, a blur with a strength corresponding to the moving speed occurs in the captured image obtained by an image capturing unit 11. If geometric information can be estimated by the learning model in a form according to the moving speed, the learning model can cope with various blurs. When the geometric information according to the actual moving speed of the automobile 1 is estimated, the position/orientation can accurately be calculated.

Figure 10:
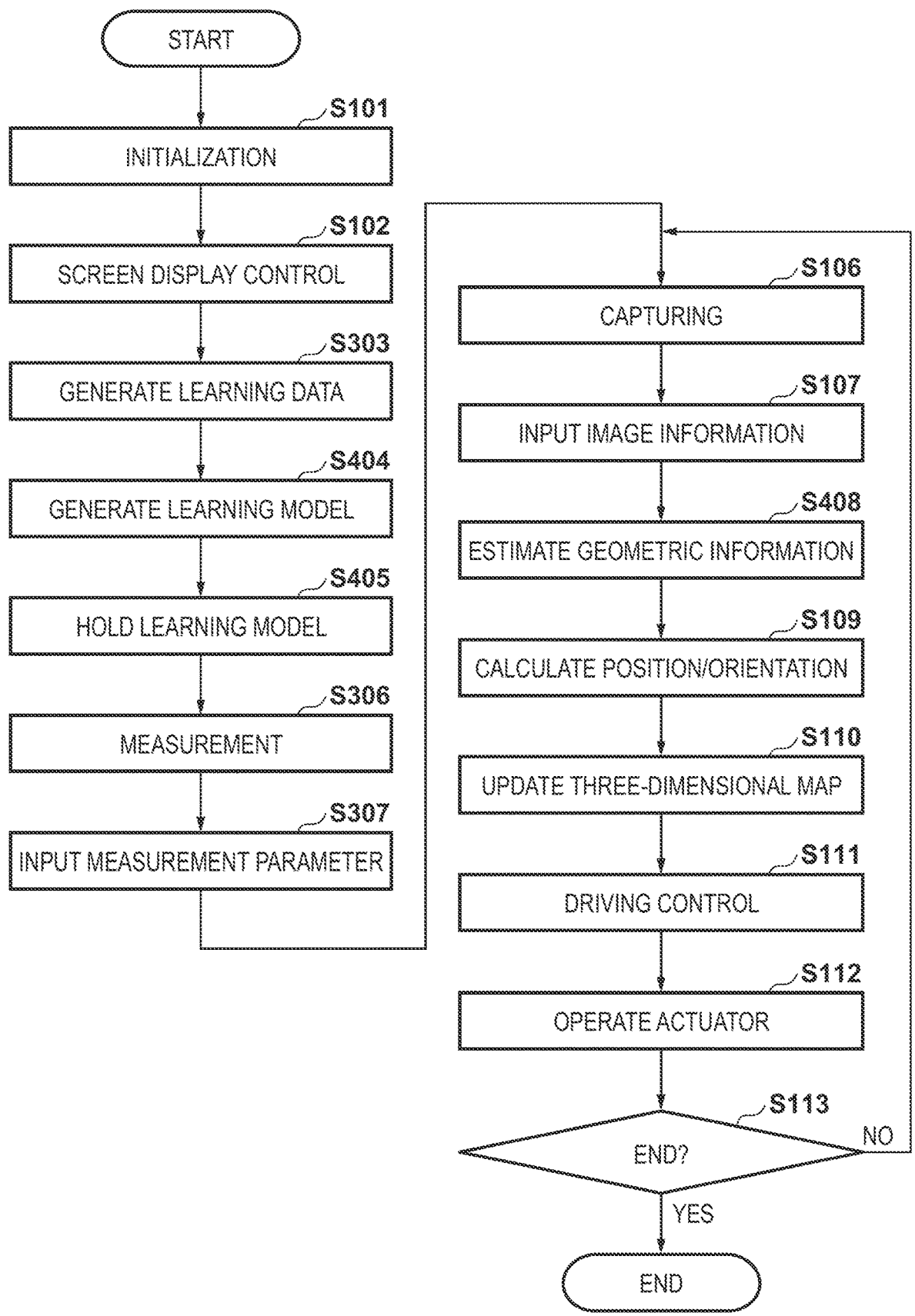
FIG. 10 is a flowchart of processing performed by the system.

Processing performed by the system according to this embodiment will be described next with reference to FIG. 10 that shows the flowchart of the processing. Note that the same step numbers as in FIG. 8 denote the same processing steps in FIG. 10, and a description thereof will be omitted.

Note that step S303 is different from step S303 described above in that the generation unit 305 outputs learning data to which the viewpoint parameters and the environment parameters used to generate the learning data are attached.

In step S404, the generation unit 406 performs learning processing of one learning model using each learning data output from the generation unit 305. In step S405, the generation unit 406 stores the learned learning model in the holding unit 407.

Step S307 is different from step S307 described above in that the input unit 308 outputs the measurement parameters from the measurement unit 31 to the estimation unit 409. In step S408, the estimation unit 409 reads out the learning model from the holding unit 407 and outputs geometric information output from the learning model when a captured image from the input unit 108 and the measurement parameters from the input unit 308 are input to the readout learning model.

As described above, according to this embodiment, since the geometric information corresponding to the captured image and the measured situation is estimated using the learning model learned using learning data based on various situations, the geometric information is suitable for the captured image and the current situation. As a result, it is possible to accurately calculate the position/orientation to be applied to automated driving of the automobile or the like.

Fifth Embodiment

Figure 11:
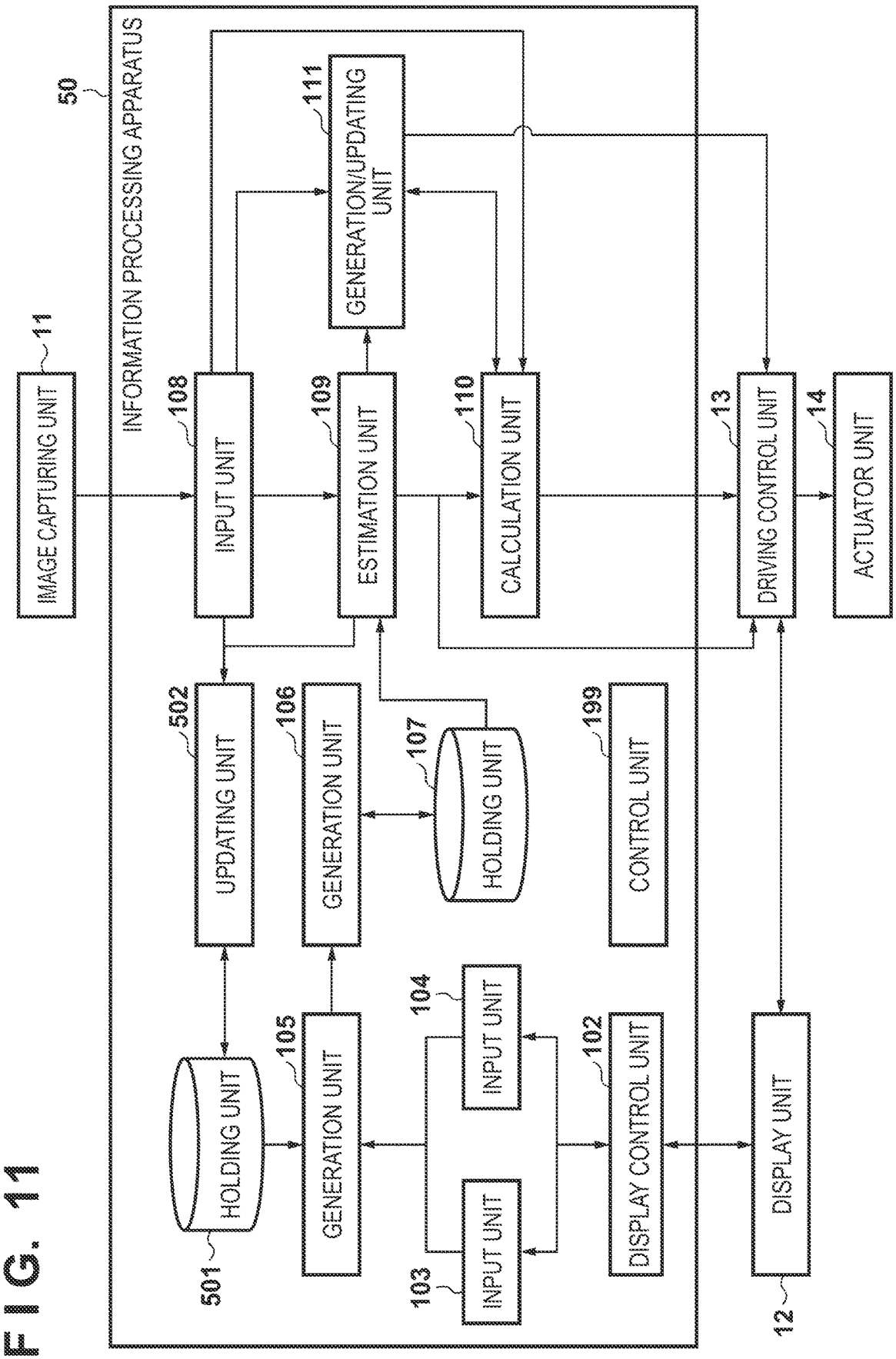
FIG. 11 is a block diagram showing an example of the functional arrangement of a system.

In this embodiment, held model data is updated using a newly captured image and geometric information estimated from the captured image using a learning model. An example of the functional arrangement of a system according to this embodiment will be described with reference to the block diagram of FIG. 11.

Model data is stored in advance in a holding unit 501. This model data can be any one of the various model data described above. In this embodiment, an updating unit 502 updates the model data held by the holding unit 501 based on a captured image that an input unit 108 acquires from an image capturing unit 11 and geometric information estimated from the captured image by an estimation unit 109.

For example, assume a case in which polygon data and texture data are used as model data. At this time, the updating unit 502 converts geometric information from the estimation unit 109 into polygon data and adds the polygon data to the model data, or corrects, in the model data, the position or orientation of a polygon corresponding to the polygon data based on the polygon data. In addition, the updating unit 502 adds the captured image as texture data to the model data, or a-blends the pixel value of a pixel in the captured image with the pixel value of a pixel of the texture data in the model data.

Additionally, for example, assume a case in which point group data and color information are used as model data. At this time, the updating unit 502 converts geometric information from the estimation unit 109 into point group data and adds the point group data to the model data, or corrects, in the model data, the position of a point group corresponding to the point group data based on the point group data. In addition, the updating unit 502 adds the pixel value of a pixel in the captured image as color information to the model data, or a-blends the pixel value of a pixel in the captured image with the color information in the model data.

Furthermore, for example, assume a case in which a set of key frame information including a depth map and color information is used as model data. At this time, the updating unit 502 adds key frame information including geometric information from the estimation unit 109 and color information based on a captured image from an input unit 308 to the model data. Note that the updating unit 502 may update the model data held by the holding unit 501 using a three-dimensional map generated by a generation/updating unit 111.

Figure 12:
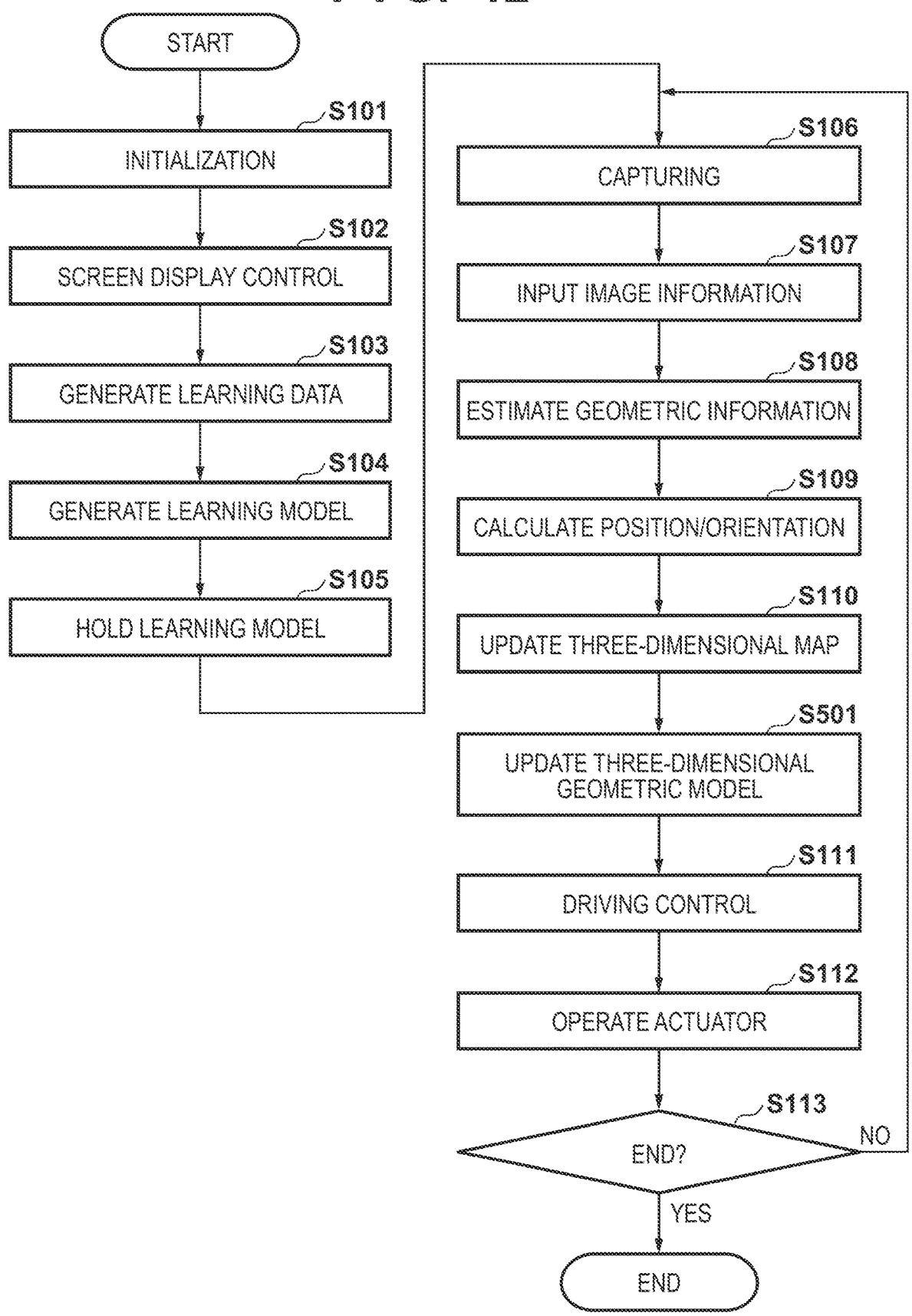
FIG. 12 is a flowchart of processing performed by the system.

Processing performed by the system according to this embodiment will be described next with reference to FIG. 12 that shows the flowchart of the processing. Note that the same step numbers as in FIG. 3 denote the same processing steps in FIG. 12, and a description thereof will be omitted.

In step S501, the updating unit 502 updates model data held by the holding unit 501, as described above. The updated model data may be loaded and used in step S101 when the system is activated next. Alternatively, every time the model data is updated, the processes of steps S101 to S105 may be performed to always use the latest model data.

As described above, according to this embodiment, model data is updated based on geometric information and the captured image of a scene in which an automobile 1 actually travels. Hence, the appearance of the scene of the image used to generate the learning model and the appearance of the scene included in the input image captured by the image capturing unit are similar. As a result, it is possible to accurately calculate the position/orientation to be applied to automated driving of the automobile or the like.

Sixth Embodiment

Figure 13:
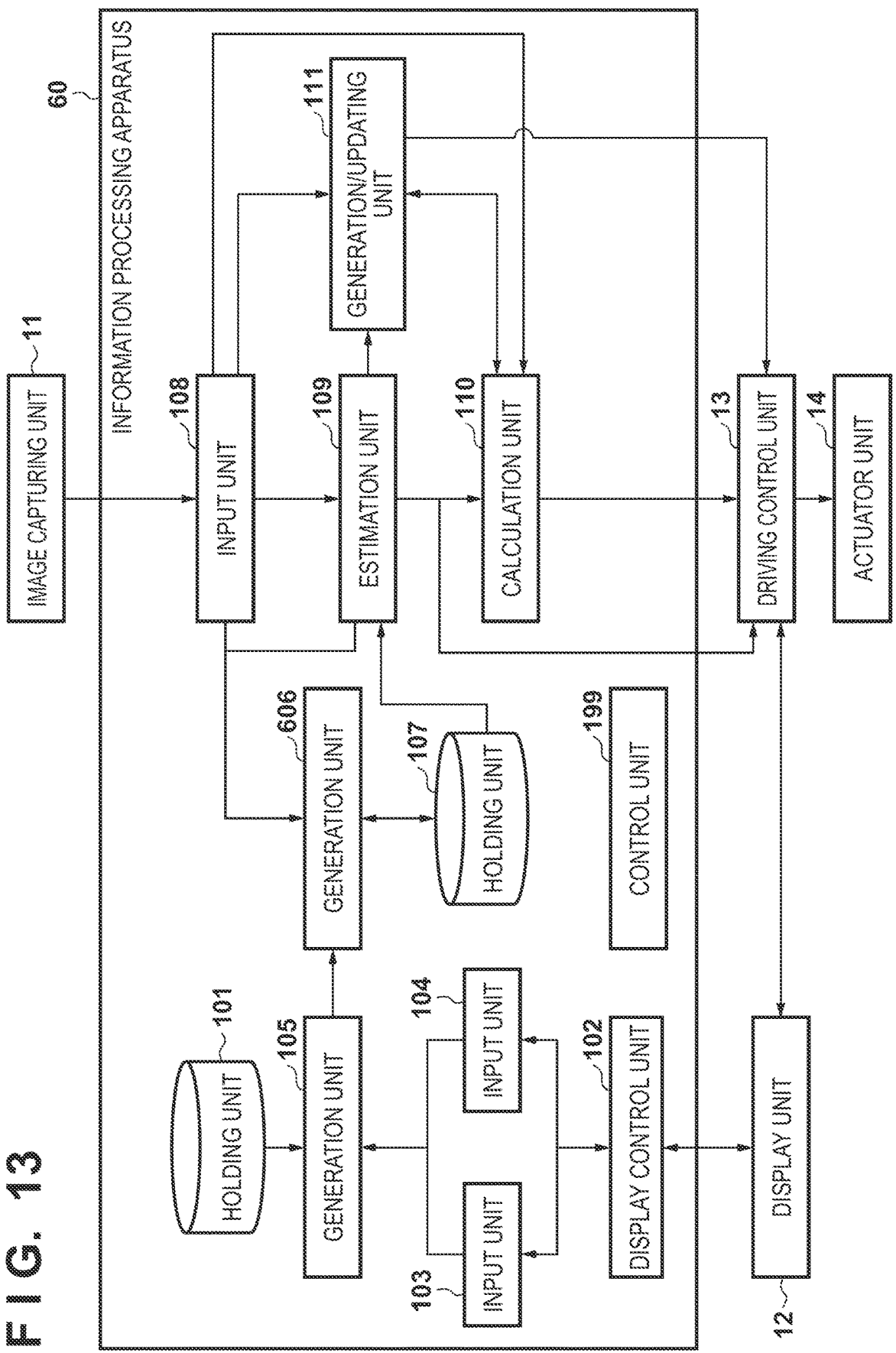
FIG. 13 is a block diagram showing an example of the functional arrangement of a system.

In this embodiment, additional learning of a learning model is performed using a captured image and geometric information output from the learning model when the captured image is input to the learning model. An example of the functional arrangement of a system according to this embodiment will be described with reference to the block diagram of FIG. 13.

A generation unit 606 performs additional learning processing of a learning model generated by performing the same learning processing as that of the generation unit 106. In the additional learning processing, the generation unit 606 uses a set of a captured image from an input unit 108 and geometric information from an estimation unit 109 as new learning data, and performs learning processing of a learning model using a plurality of pieces of learning data including the new learning data and learning data generated by the generation unit 105. By this additional learning processing, the learning model stored in a holding unit 107 is updated. Note that in the additional learning processing, the generation unit 606 may perform learning processing of the learning model using, as new learning data, a set of the captured image from the input unit 108 and the geometric information from the estimation unit 109.

Figure 14:
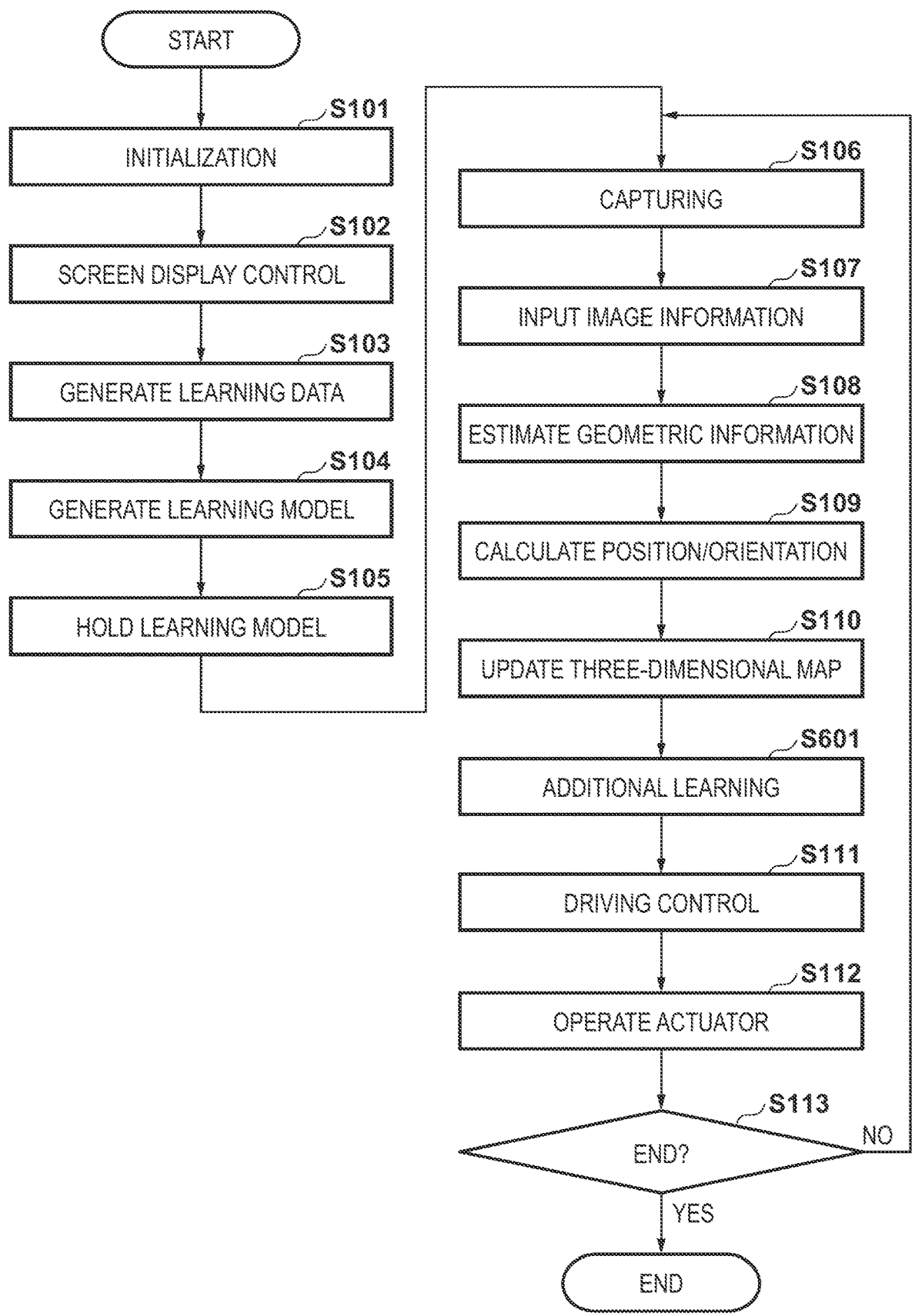
FIG. 14 is a flowchart of processing performed by the system.

Processing performed by the system according to this embodiment will be described next with reference to FIG. 14 that shows the flowchart of the processing. Note that the same step numbers as in FIG. 3 denote the same processing steps in FIG. 14, and a description thereof will be omitted.

In step S601, the generation unit 606 uses a set of a captured image from the input unit 108 and geometric information from the estimation unit 109 as new learning data, and performs learning processing of a learning model using a plurality of learning data including the new learning data and learning data generated by the generation unit 105.

The learning model obtained by the additional learning processing may be loaded and used in step S101 when the system is activated next time. Alternatively, every time the additional learning processing is performed, the learning model may be used to estimate geometric information in step S108.

As described above, according to this embodiment, additional learning processing of a learning model is performed based on geometric information and the captured image of a scene in which an automobile 1 actually travels. Hence, the appearance of the scene of the image used to generate the learning model and the appearance of the scene included in the input image captured by the image capturing unit are similar. As a result, it is possible to accurately calculate the position/orientation to be applied to automated driving of the automobile or the like.

Seventh Embodiment

Some or all of the components described in the above embodiments and modifications may be appropriately combined. In addition, some or all of the components described in the above embodiments and modifications may be selectively used. Furthermore, the types and the numerical values of the parameters described above are merely examples used to make detailed descriptions and may be appropriately changed.

For example, in the above-described embodiments, the driving control unit 13 is an external device of the information processing apparatus, but may be integrated with the information processing apparatus. This also applies to the image capturing unit, the display unit, and the measurement unit described above. The devices to be integrated with the information processing apparatus are not limited to specific examples.

Additionally, for example, in the first embodiment and the like, learning data is generated based on model data held by the holding unit 101. However, for example, a set of distance information measured by the measurement unit 21 and a captured image obtained by the image capturing unit 22 may be used as learning data directly (or after appropriately processing).

Also, for example, in the first embodiment and the like, generation of learning data may be performed not based on the parameters concerning the viewpoint and the parameters concerning the environment but based on only the parameters concerning the viewpoint. For example, in a case in which a combination of color information and distance data (point group data) in an actual environment obtained using a three-dimensional measurement unit or an image capturing unit is used as model data or in a case in which key frame information including color information and a depth map obtained using a three-dimensional measurement unit or an image capturing unit and associated with the position/orientation in the environment is used as model data, the parameters concerning the environment are sometimes unnecessary for generation of learning data.

Additionally, for example, in the first embodiment and the like, generation of learning data may be performed not based on the parameters concerning the viewpoint and the parameters concerning the environment but based on only the parameters concerning the environment. For example, in a case in which the automobile 1 and the automobile 2 are identical, and the parameters concerning the viewpoint are common, the parameters concerning the viewpoint are sometimes unnecessary for generation of learning data.

Furthermore, for example, in the first embodiment and the like, a plurality of examples have been described as the parameters concerning the viewpoint and the parameters concerning the environment. However, not all the parameters are necessary for generation of learning data, and at least one parameter suffices (or the number of parameters may be zero, as described above).

Eighth Embodiment

Each functional unit of information processing apparatus shown in FIG. 2, 5, 7, 9, 11, or 13 may be implemented by hardware (for example, embedded hardware), or some functional units may be implemented by software (computer program). In the latter case, for example, a functional unit explained as a holding unit may be implemented by a memory, and the remaining functional units may be implemented by software. In this case, a computer apparatus including the memory and a processor capable of executing the software can be applied to the information processing apparatus described in each of the above embodiments and modifications. An example of the hardware arrangement of the computer apparatus will be described with reference to the block diagram of FIG. 15.

A CPU 1501 executes various kinds of processing using computer programs or data stored in a RAM 1502 or a ROM 1503. The CPU 1501 thus controls the operation of the entire computer apparatus and executes or controls each processing described above as processing to be performed by each of the above-described information processing apparatuses. The CPU 1501 functions as, for example, the above-described control unit 199.

The RAM 1502 has an area to store a computer program and data loaded from the ROM 1503 or an external storage device 1505 or data received from the outside via an OF (interface) 1506. The RAM 1502 further has a work area used by the CPU 1501 to execute various kinds of processing. In this way, the RAM 1502 can appropriately provide various kinds of areas. The ROM 1503 stores a computer program and data, which need not be rewritten.

An operation unit 1504 is formed by a user interface such as a keyboard, a mouse, or a touch panel screen, and the user can input various kinds of instructions to the CPU 1501 by operating the operation unit 1504. For example, the user can perform an operation input to the GUI shown in FIG. 4 by operating the operation unit 1504.

The external storage device 1505 is a mass information storage device represented by a hard disk drive. An OS (Operating System) and computer programs and data configured to cause the CPU 1501 to execute or control the various kinds of processing described above as processing to be performed by each of the above-described information processing apparatuses are saved in the external storage device 1505. The computer programs saved in the external storage device 1505 include computer programs configured to cause the CPU 1501 to implement the function of each functional unit other than the holding units in the functional units shown in FIGS. 2, 5, 7, 9, 11, and 13. The computer programs saved in the external storage device 1505 also include a computer program concerning the GUI shown in FIG. 4. In addition, the data saved in the external storage device 1505 include data described as known information in the above explanation, data described as data held by the holding unit, and data concerning the GUI shown in FIG. 4. The computer programs and data saved in the external storage device 1505 are appropriately loaded into the RAM 1502 under the control of the CPU 1501 and processed by the CPU 1501.

The I/F 1506 functions as a user interface configured to perform data communication with an external device, and, for example, the image capturing unit, the display unit, the measurement unit, the driving control unit, the information processing apparatus 20, and the like described above are connected to the I/F 1506.

Figure 15:
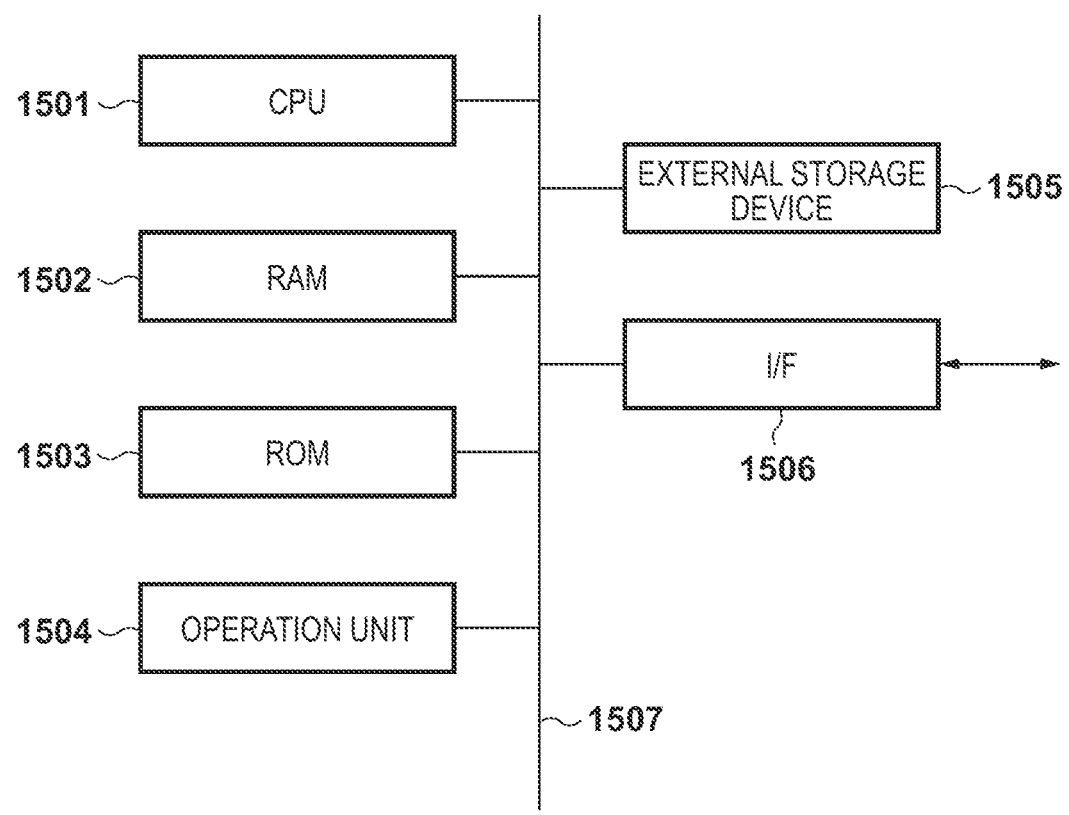
FIG. 15 is a block diagram showing an example of the hardware arrangement of a computer apparatus.

All the CPU 1501, the RAM 1502, the ROM 1503, the operation unit 1504, the external storage device 1505, and the I/F 1506 are connected to a bus 1507. Note that the components shown in FIG. 15 are merely example of components applicable to the above-described information processing apparatus. In addition, the components shown in FIG. 15 are also applicable to the information processing apparatus 20.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-004468, filed Jan. 15, 2018, which is hereby incorporated by reference herein in its entirety.

What is claimed is:

1. An information processing apparatus comprising:
   (i) a memory configured to store computer-executable instructions and a processor configured to execute the computer-executable instructions stored in the memory, (ii) an integrated circuit, or both (i) and (ii) that implement:
   a generation unit configured to render an image of a virtual space corresponding to a physical space and geometric information of the virtual space using a parameter concerning a viewpoint in the virtual space and a parameter concerning an environment of the virtual space to generate, as learning data, the image of the virtual space and the geometric information of the virtual space;
   a learning unit configured to perform learning processing of a learning model using the learning data;
   an acquisition unit configured to acquire a captured image of the physical space captured by an image capturing device; and
   a calculation unit configured to calculate a position and/or orientation of the image capturing device based on geometric information that is output from the learning model to which the captured image acquired by the acquisition unit is input.

2. The apparatus according to claim 1, wherein the generation unit generates the image and the geometric information using model data representing a geometric shape of the virtual space, the parameter concerning the viewpoint in the virtual space, which is different from a viewpoint of the image capturing device, and the parameter concerning the environment of the virtual space.

3. The apparatus according to claim 1, wherein the parameter concerning the viewpoint includes at least one of a position and/or orientation of the viewpoint, the number of viewpoints, a moving speed of the viewpoint, and a focal length, a principal point, an exposure time, and a focus position of the viewpoint.

4. The apparatus according to claim 1, wherein the parameter concerning the environment includes at least one of a parameter that defines an illumination condition in the virtual space, a type of a model arranged in the virtual space, the number of models, and a position, an orientation, and a size of the model.

5. The apparatus according to claim 1, wherein (i) the memory configured to store the computer-executable instructions and the processor configured to execute the computer-executable instructions stored in the memory, (ii) the integrated circuit, or both (i) and (ii) further implement a unit configured to set the parameter concerning the viewpoint and the parameter concerning the environment.

6. The apparatus according to claim 2, wherein the model data is data generated by an apparatus different from the information processing apparatus based on information obtained by three-dimensionally measuring the physical space.

7. The apparatus according to claim 2, wherein (i) the memory configured to store the computer-executable instructions and the processor configured to execute the computer-executable instructions stored in the memory, (ii) the integrated circuit, or both (i) and (ii) further implement a unit configured to update the model data based on the captured image and the geometric information output from the learning model to which the captured image is input.

8. The apparatus according to claim 1, wherein the learning unit performs additional learning of the learning model based on the captured image and the geometric information output from the learning model to which the captured image is input.

9. The apparatus according to claim 1, wherein
   the generation unit generates the learning data for each predetermined situation,
   the learning unit performs, for each predetermined situation, the learning processing of the learning model using the learning data generated for the predetermined situation by the generation unit, and
   the calculation unit selects, from the learning model generated by the learning unit for each predetermined situation, a learning model corresponding to a measured situation and calculates the position and/or orientation of the image capturing device based on the geometric information that is output from the selected learning model to which the captured image acquired by the acquisition unit is input.

10. The apparatus according to claim 1, wherein
    the generation unit generates the learning data for each predetermined situation,
    the learning unit performs the learning processing of the learning model using the learning data and a situation corresponding to the learning data, and
    the calculation unit calculates the position and/or orientation of the image capturing device based on the geometric information that is output from the learning model to which the captured image acquired by the acquisition unit and the measured situation are input.

11. The apparatus according to claim 1, wherein the geometric information is a depth map of the virtual space.

12. The apparatus according to claim 1, wherein the generation unit generates the image of the virtual space and the geometric information of the virtual space in a scale within a predetermined range.

13. The apparatus according to claim 1, wherein the captured image and the geometric information output from the learning model have a scale within a predetermined range.

14. The apparatus according to claim 1, wherein (i) the memory configured to store the computer-executable instructions and the processor configured to execute the computer-executable instructions stored in the memory, (ii) the integrated circuit, or both (i) and (ii) further implement a unit configured to generate/update a three-dimensional map of the physical space based on the captured image, the geometric information, and the position and/or orientation of the image capturing device,
wherein the calculation unit calculates the position and/or orientation of the image capturing device based on the geometric information and the three-dimensional map.

15. The apparatus according to claim 1, wherein the calculation unit calculates a position and/or orientation of a vehicle including the information processing apparatus based on the position and/or orientation of the image capturing device.

16. An information processing method performed by an information processing apparatus, comprising:
rendering an image of a virtual space corresponding to a physical space and geometric information of the virtual space using a parameter concerning a viewpoint in the virtual space and a parameter concerning an environment of the virtual space to generate, as learning data, the image of the virtual space and the geometric information of the virtual space;
performing learning processing of a learning model using the learning data;
acquiring a captured image of the physical space captured by an image capturing device; and
calculating a position and/or orientation of the image capturing device based on geometric information that is output from the learning model to which the captured image acquired by the acquisition unit is input.

17. A non-transitory computer-readable storage medium storing a computer program configured to cause a computer to function as:
a generation unit configured to render an image of a virtual space corresponding to a physical space and geometric information of the virtual space using a parameter concerning a viewpoint in the virtual space and a parameter concerning an environment of the virtual space to generate, as learning data, the image of the virtual space and the geometric information of the virtual space;
a learning unit configured to perform learning processing of a learning model using the learning data;
an acquisition unit configured to acquire a captured image of the physical space captured by an image capturing device; and
a calculation unit configured to calculate a position and/or orientation of the image capturing device based on geometric information that is output from the learning model to which the captured image acquired by the acquisition unit is input.

18. An information processing apparatus comprising:
(i) a memory configured to store computer-executable instructions and a processor configured to execute the computer-executable instructions stored in the memory, (ii) an integrated circuit, or both (i) and (ii) that implement:
a generation unit configured to generate for each position and orientation of a virtual viewpoint in a virtual space corresponding to a physical space, as learning data, an image of the virtual space viewed from the virtual viewpoint having the position and orientation and geometric information representing a geometric shape of the virtual space viewed from the virtual viewpoint having the position and orientation;
a learning unit configured to perform, using the learning data, learning processing in which a learning model learns correspondence relationship between the image of the virtual space and the geometric information of the virtual space; and
a calculation unit configured to calculate a position and/or orientation of an image capturing device based on geometric information output from the learning model to which a captured image of the physical space captured by the image capturing device is input.

* * * * *